United States Patent [19]
Mori

[11] Patent Number: 5,809,229
[45] Date of Patent: Sep. 15, 1998

[54] RUNAWAY DETECTION/RESTORATION DEVICE

[75] Inventor: Yoshiteru Mori, Kitakatsuragi-gun, Japan

[73] Assignee: Sharp Kabushiki Kaisha, Osaka, Japan

[21] Appl. No.: 717,307

[22] Filed: Sep. 20, 1996

[30] Foreign Application Priority Data

Sep. 20, 1995 [JP] Japan ................................. 7-241849

[51] Int. Cl.⁶ .................................................. G06F 11/00
[52] U.S. Cl. ...................................................... 395/185.08
[58] Field of Search ........................ 395/185.08, 185.04; 364/221.7, 551.01, 264, 264.2, 264.5, 265, 267.9, 267, 267.8, 943.9, 944.9, 945.2, 945, 944.61, 285.3, 268.9

[56] References Cited

U.S. PATENT DOCUMENTS

| | | | |
|---|---|---|---|
| 4,639,852 | 1/1987 | Motomiya | 364/138 |
| 4,796,211 | 1/1989 | Yokouchi et al. | 364/569 |
| 4,803,682 | 2/1989 | Hara et al. | 371/12 |
| 5,057,999 | 10/1991 | Kase et al. | 364/200 |
| 5,341,497 | 8/1994 | Younger | 395/575 |
| 5,404,356 | 4/1995 | Abe | 371/16.3 |
| 5,408,643 | 4/1995 | Katayose | 395/575 |
| 5,594,865 | 1/1997 | Saitoh | 395/185.08 |
| 5,638,510 | 6/1997 | Ishikawa | 395/185.04 |

FOREIGN PATENT DOCUMENTS

| | | | | |
|---|---|---|---|---|
| 2-264341 | 10/1990 | Japan | | G06F 11/30 |
| 4-131965 | 5/1992 | Japan | | G06F 15/21 |
| 7-334381 | 12/1995 | Japan | | G06F 11/14 |

Primary Examiner—Robert W. Beausoliel, Jr.
Assistant Examiner—Stephen C. Elmore
Attorney, Agent, or Firm—David G. Conlin; David D. Lowry

[57] ABSTRACT

The invention provides a runaway detection/restoration device which enables an automatic restoration of a high degree of safety and carries out the control of devices when the runaway of a CPU has been generated. The runaway detection/restoration device is provided with runaway detecting means such as a watchdog timer 89 or the like which monitors troubles in a sequential control program for the device operations, and a memory 87 which stores information related to the runaway detected by the runaway detecting means, for the CPU 82 which controls the devices. The runaway detection/restoration device judges whether or not the CPU 82 is automatically restored according to the information related to the runaway stored at the time of the detection of a new runaway, such as the number of times runaway was detected, operation mode at the time of the detection of the runaway and the generation frequency of the runaway.

8 Claims, 22 Drawing Sheets

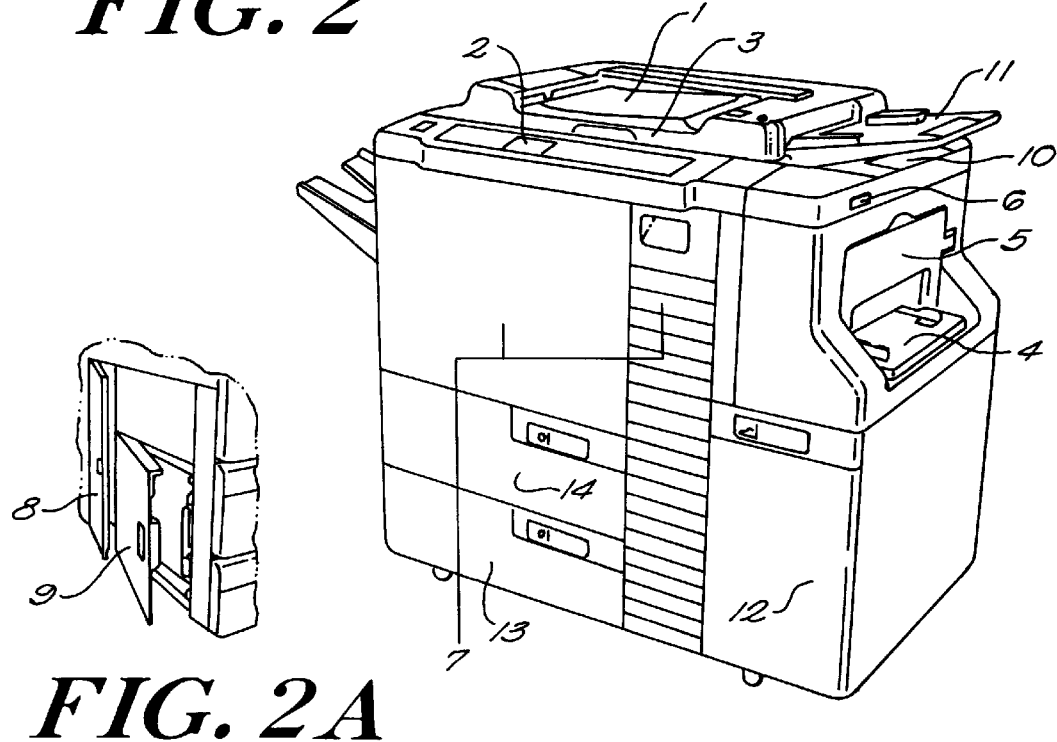
FIG. 2
FIG. 2A
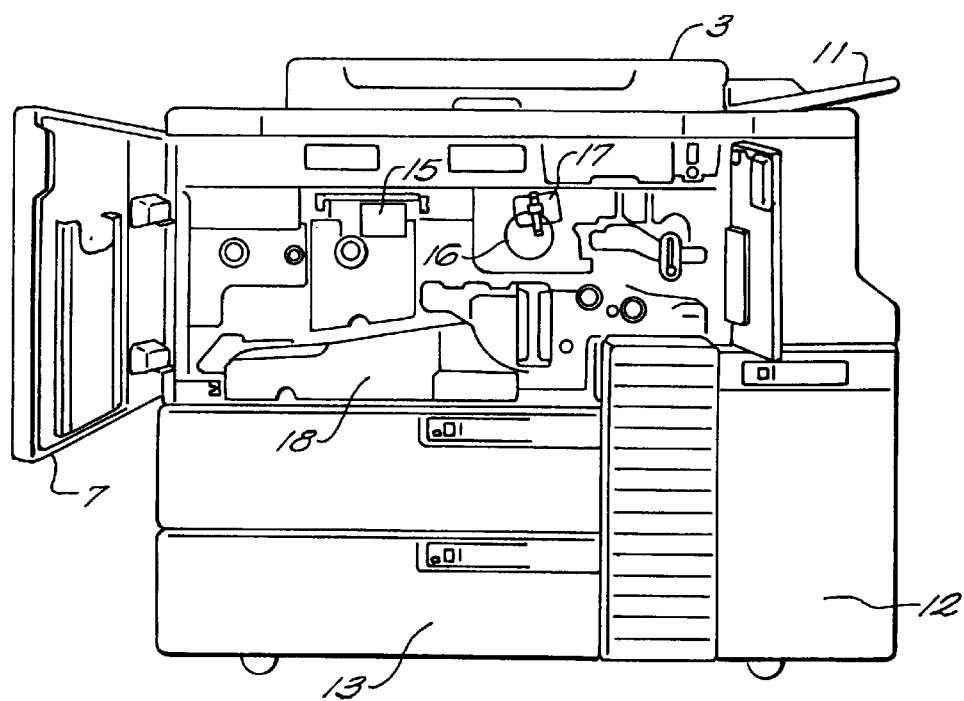
FIG. 3

| INPUTS | | | OUTPUTS | | | |
|---|---|---|---|---|---|---|
| ENABLE | SELECT | | | | | |
| G | B | A | Y0 | Y1 | Y2 | Y3 |
| H | X | X | H | H | H | H |
| L | L | L | L | H | H | H |
| L | L | H | H | L | H | H |
| L | H | L | H | H | L | H |
| L | H | H | H | H | H | L |

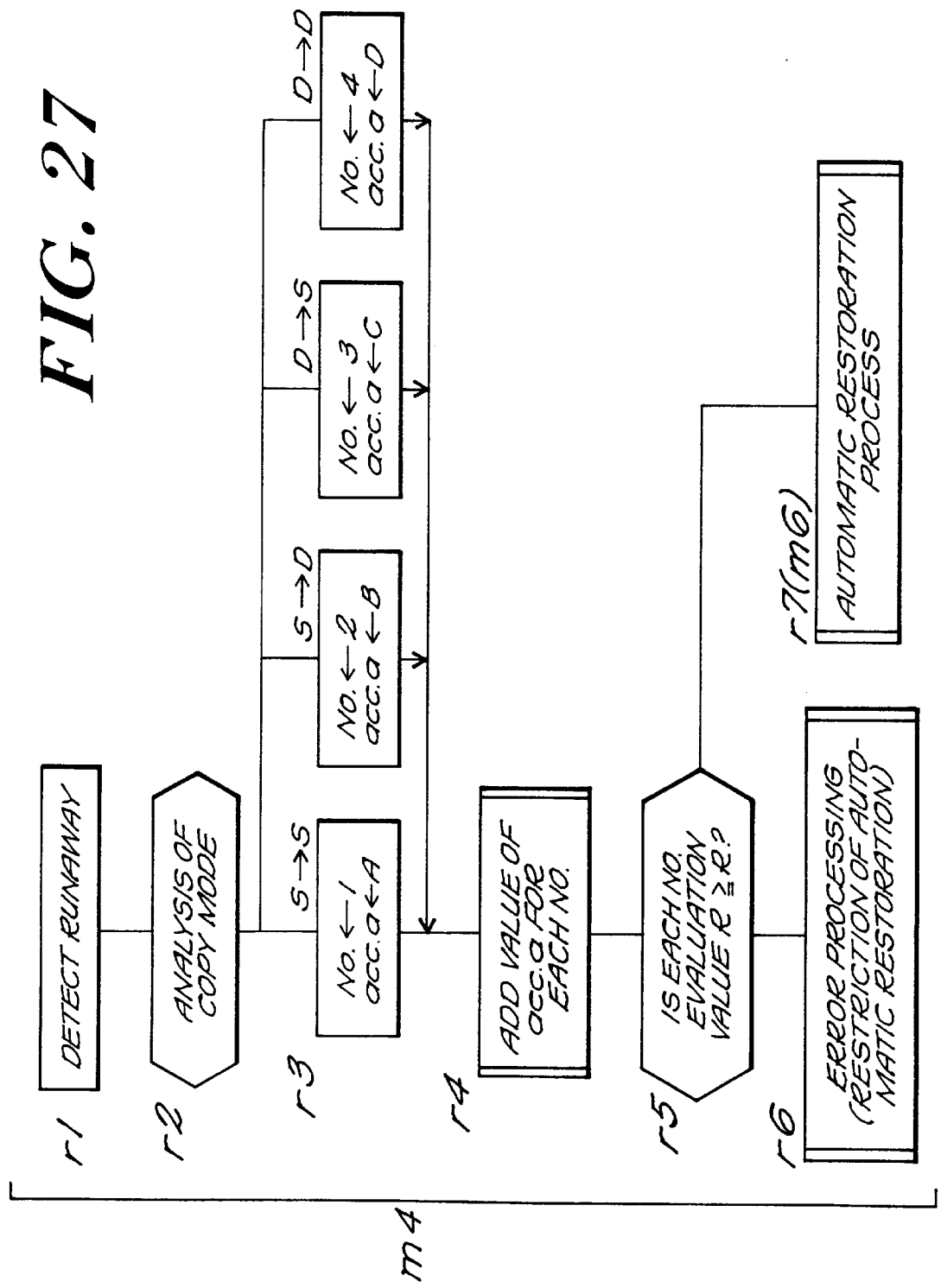

RUNAWAY DETECTION/RESTORATION DEVICE

BACKGROUND OF THE INVENTION

1. Field of the Invention

The present invention relates to a runaway detection/restoration device which detects a runaway of a CPU and automatically restores a normal operation thereof, in an apparatus where the CPU (microcomputer) is used as a processor to control the apparatus, particularly in heating devices such as heaters and the like, drive devices such as motors and the like, copying machines (including both analog and digital types) equipped with a high-voltage section employing the Carlson process, laser printers, laser facsimiles, and image forming apparatuses which combines these.

2. Description of the Related Art

In an apparatus using a CPU, a runaway of the CPU causes the CPU to miss an object which should be essentially controlled, thereby inviting a serious result in some cases. In a copying machine, for example, when a CPU which controls a heater controls for fixing an image generates the runaway so that the CPU cannot be controlled, it is expected that the heater heats up abnormally thereby damaging or losing control devices and peripheral parts thereof by burning them.

In addition, a copying machine which has many moving parts has a member which repeats a reciprocal motion at a high speed. In the case where the member cannot be controlled due to the runaway of the CPU, it sometimes happens that the apparatus itself might be broken, and there is a possibility that the body of a person who operates the apparatus might be subjected to danger. Furthermore, most of rotating members are driven by motors via drive transmission mechanisms. In the case where the motor cannot be controlled due to the runaway of the CPU, there is a danger that a hand of a person who operates the apparatus is inadvertently caught by parts.

In the case where such troubles can be expected even as a mere possibility, it is common to provide a some form of fail-safe mechanism in addition to a CPU control (a control by a program) so that such troubles will not be caused only by the runaway of the CPU. That is, a heater is provided with a thermal fuse to prevent the burning, damaging and losing the apparatus due to abnormal heating. Then the heater is provided with a circuit that detects abnormal current in a motor part. The heater is constituted so that no person can inadvertently touch the drive sections.

A proposal has been also made that some detecting means is provided for detecting the runaway of the CPU thereby automatically restoring a normal control of the apparatus. For example, Japanese Patent Unexamined Publication No. 2-264341, JP-A 2-264341 relates to a disclosure of a runaway detection and restoration method for the CPU to detect the runaway of the CPU and restore the initial condition thereof.

The mode disclosed in JP-A 2-264341 includes:

(1) module number recognizing means for recognizing the module number every time a software module is carried out while assigning to each software module numbers corresponding to an order of the execution of the module when a particular process is to be carried out by executing a plurality of independent software modules in a specified procedure, counting means composed of hardware which counts the number of times each software module has been carried out, comparing means for comparing the count of the counting means and the module number recognized by the module recognizing means, and CPU resetting means for resetting the CPU when comparison by the comparing means results in disagreement.

(2) counting operation by the comparing means is disabled when the same software module is repetitively carried out.

In addition to the detecting means described above, watchdog timers have been frequently used as means to detect the runaway of CPUs. A well-known type of watchdog timer, for example, is such that a program is provided to write specified data in a particular area of memory at predetermined intervals and the data in the memory area is constantly checked by other means so that, when the stored data becomes other than the specified data, it is judged that the runaway of the CPU has been generated.

A watchdog timer generally judges that the CPU is operating abnormally by detecting whether or not a particular processing routine is carried out within a specified period of time as described above.

In addition to the watchdog timer, there are various means for detecting abnormal states of the CPU. Typical means are as follows.

(1) Detection of execution of undefined instructions

When an undefined instruction, among instructions provided in the CPU, is read into the CPU, the CPU itself detects the undefined instruction and processes such instruction as an abnormal state. Generally the CPU itself has this function. When an abnormal state is detected, the highest priority interruption (internal interruption) is generally carried out.

(2) Violation against privileged instruction

An instruction system of a CPU is divided into a plurality of ranks so that instructions of higher ranks are not carried out without executing a particular operation. When an instruction is read for executing a privileged instruction of a higher rank is read without executing the particular operation in a state of lower rank, the CPU itself detects the instruction and processes it as an abnormal state. This function is also generally provided in the CPU as in the case of (1).

(3) Illegal memory access beyond boundary

A boundary is specified in a memory within which the CPU can access and, when an attempt is made to access the memory is beyond the boundary, the access is detected and processed as an abnormal state. Furthermore, an area of memory accessible by the CPU is set to be write-only or read-only and illegal access (an attempt to read from write-only area or write into read-only area) is detected and processed as an abnormal state.

Any of the detecting means described above are constituted as hardware installed outside the CPU or a hardware packaged in the CPU itself.

For restoring a normal operation from the abnormal state, the following three means are available.

(1) Hardware that resets the CPU from the outside when the abnormal state is detected, and restores the CPU forcibly to the initial condition.

(2) Software that interrupts the CPU when the abnormal state is detected, and restores the CPU forcibly to the initial condition as interruption processing.

(3) Hardware installed outside resets the CPU to restore the CPU forcibly to the initial condition by means of software of (2) described above.

As a typical hardware to carry out functions of detecting the abnormal state and restoring the normal state from the abnormal state described above, a lot of reset ICs with built-in watchdog timers have been put in market in recent years (the timer in this case usually starts automatically after canceling the reset and accesses the reset IC from the CPU before time-up, thereby resetting the timer). This has such a configuration that a watchdog timer is added to a reset circuit which resets the CPU when the power voltage becomes below the specified level when the power is turned on and, when the watchdog timer detects a runaway, a reset signal similar to that when turning on the power is sent to the CPU even when the power supply is normal. Therefore, the CPU carries out the same procedure as that when turning on the power and does not have a particular process to be done when the runaway is detected.

Besides the use of the reset IC, generally an output from the runaway detecting means based on the watchdog timer is connected to an interruption terminal of the CPU to process a trouble by means of an interruption program of the CPU, while an automatic restoration means similar to the resetting means is usually employed as described in the Publication described above.

Furthermore, when the watchdog timer is incorporated in the CPU and detects the runaway, a forcible interruption (internal interruption) is applied to the CPU, but also in this case the same means as the resetting process as described above is usually employed for processing the interruption.

The runaway of a CPU is generated either by an internal cause or an external cause. Internal causes include software problems such as a bug in the program and hardware problems such as a defective IC mounted around the CPU. The runaway of the CPU itself may, although rarely, also be generated by a defect in an internal circuit of the CPU.

External causes include environmental factors such as external noise.

The runaway of the CPU can be generated by various causes, while the majority of the runaway cases are resulted from the causes described above. The runaway of the CPU can be also generated by the complication of two or more of the causes described above. There are also such cases in which the CPU tends to generate the runaway. There are also cases in which the runaway is generated sporadically (accidentally) and that runaway is generated in what can be called the mixture of these generation modes. Thus, it is difficult to predict the runaway generation.

The runaway of the CPU leads to various situations. When the CPU controls an apparatus, there is a possibility that a fatal situation such as fire or the like might be generated. However, in the prior art, an emphasis has been often placed on detecting the runaway of the CPU reliably rather than identifying the cause of the runaway. And the restoration after detecting the runaway is done by resetting the CPU in many cases. Little attention is paid to the removal of the cause of the runaway with the result that there always remains a possibility that the CPU generates the runway again even after the restoration.

Specifically, discussion will be made on the prior art employing the watchdog timer as the runaway detecting means below.

(1) Hardware configuration

The prior art is provided with the watchdog timer as means for detecting the runaway of the CPU and means for interrupting the CPU as the highest priority when the runaway is detected (namely the CPU is designed to enter an interruption processing procedure whenever an interruption is requested). Apparatuses to be controlled are printers, copying machines and the like, and they have a heating section. The CPU controls a movable section such as scanner or the like.

(2) Interruption processing when the runaway is detected

The prior art is provided with means for resetting the CPU incorporated therein for an automatic restoration of the apparatus, while an interruption is processed by resetting the CPU by means of the resetting means. When the CPU is reset, the CPU controls the apparatus in the same sequence as that of turning on the power. Such prior art has the following problems.

(1) Difficulty in identifying the cause of runaway

The runaway can be detected but the cause thereof is difficult to be identified, and no means is available for removing the cause thus leaving the possibility of the recurrence of the runaway. Even in such a case that the CPU persistently generates the runaway under particular conditions due to a bug of a program or the like, the error state is reset after the detection and therefore the means to suppose the cause is lost.

(2) Inability to deal with a situation when the automatic restoration is inappropriate Because of the automatic restoration by resetting the CPU without removing the cause of the runaway, there is a possibility that a cycle of (runaway detected—automatic restoration—runaway detected) is repeated. A typical example of this is the case of a program bug described in (1), in that the CPU generates the runaway under particular conditions.

(3) Difficulty in removing the cause of the runaway

Because the CPU is reset after the runaway is detected, it is difficult to identify the conditions under which the runaway is generated, thus making it difficult to remove the cause. Particularly, when the runaway was generated by an external cause, even when a fatal accident could be prevented by detecting the runaway, most of runaway incidents are generated irregularly and it is often difficult to take safety measures subsequently. Furthermore, even when the runaway is generated periodically by an internal cause as in the case of (1), too, no means is available for identifying the conditions that generate the runaway, and therefore it is difficult to remove the cause of runaway.

(4) Increasing the possibility that the runaway is not detected

When the watchdog timer serves as the sole runaway detecting means, there is a higher possibility that CPU generates the runaway without being detected. That is, when the frequency of repeating the detection of the runaway and the automatic restoration increases, it is expected that the possibility is become higher that the CPU generates the runaway which cannot be detected by the runaway detecting means of the CPU depending on the kind of the cause of the runaway generation. In order to avoid such a situation, it is necessary to newly provide or add a more reliable runaway detecting means.

(5) Memory may eventually be damaged.

Because a certain length of time is required until the runaway of a CPU is detected after the generation of the runaway, there is a possibility that data (stored in nonvolatile memory) is damaged during this period. The fact that the CPU which serves for controlling an apparatus loses the control data means that a new of the runaway is inherent, and there might arise a case in which a normal operation of the apparatus can no longer expected because of the absence of the data.

SUMMARY OF THE INVENTION

Accordingly, an object of the present invention is to provide a runaway detection and restoration device which is capable of safely controlling an apparatus by enabling an automatic restoration with a high degree of safety. Another object of the invention is to provide a runaway detection and restoration device which is capable of protecting a memory against the runaway of a CPU.

The invention relates to a runaway detection and restoration device comprising:

a processor such as a CPU for controlling an apparatus, runaway detecting means for monitoring an abnormal state of a sequential control program that controls an operation of the apparatus;

memory means for storing information related to a runaway detected by the runaway detecting means; and judging means for judging at the time of the detection of a new runaway, whether the CPU is automatically restored or an operation control is suspended depending on the information related to the runaway which has been stored.

Here, the runaway detecting means serves as detecting means such as a watchdog timer, an undefined instruction execution detector, privilege violation detecting means or illegal memory access across boundary detecting means. Any of the phenomena is processed by interrupting the CPU, and therefore information related to runaway such as past history of the runaway can be obtained. Thus, it is made possible to conjecture the cause of the runaway and process such a situation that automatic restoration is not appropriate, thereby making an appropriate process to avoid the recurrence of the B. Furthermore, since the cause of runaway can be conjectured, it is also possible to remove the cause and avoid the generation of the runaway beforehand by predicting the danger. Furthermore, when the automatic restoration generates the breakage of memory, it is possible to check the memory during the detection of the runaway and therefore the automatic restoration can be avoided, and the memory can be protected.

Furthermore, in the invention, information related to the runaway is associated with an operation mode at the time of the detection of the runaway, the automatic restoration is carried out when the number of times the runaway is detected in the same operation mode is smaller than a specified number of times, and when the number of times the runaway is detected is equal to or larger than the specified number of times, an error indication is given and the automatic restoration is carried out, or the operation control of the apparatus is stopped.

Thus it is possible to associate the runaway of the CPU to an operation mode and to conjecture the cause of the runaway corresponding to the mode. On the other hand, when the runaway is detected regardless of the operation mode, it can be conjectured that the runaway is generated by a sporadic external cause.

Furthermore, in the invention, information related to the runaway is associated with the operation mode at the time when the runaway is detected, and when the number of runaway incidents detected in the same operation mode is equal to or larger than a specified number of times, the automatic restoration is carried out to store the operation mode and the operation of the apparatus is inhibited when the operation mode is selected.

In this case, the operation is prohibited only when a particular operation mode is selected while allowing the operation in other operation modes because no trouble is expected therefrom. This makes it possible to minimize the downtime of the apparatus.

Also according to the invention, information related to runaway is the frequency of runaway generation while automatic restoration is carried out when the frequency of runaway generation is below a specified level and the operation control of the apparatus is stopped when the frequency of runaway generation is equal to or greater than the specified level.

The frequency of runaway generation refers to a frequency obtained from recurrence probability of the runaway or from the probability determined at the time of the previous runaway generation and the probability determined at the time of the present runaway generation, and represents the degree of danger. The frequency is assigned with a lighter weight when the runaway is sporadic judging from the past history of the runaway generation and the situation of detecting the runaway, and heavier weight is assigned to a type of runaway which would e fatal for the apparatus, thereby to determine the frequency of runaway generation. By this procedure, the frequency of runaway generation expected next is determined and the type of the runaway is predicted, thereby deciding whether or not the automatic restoration is to be carried out depending on the value of the frequency of runaway generation. Furthermore, the values of the frequency of runaway generation may be divided into a plurality of ranks thereby determining the type of process to be done according to the value thereof.

Furthermore, in the invention, the runaway detection and restoration device comprises:

first memory means for storing information related to the runaway which is detected by the runaway detecting means;

second memory means for storing information related to the operation;

verifying means for confirming the information stored in the second memory means; and judging means for judging whether or not the automatic restoration is carried out depending on the content of the information related to runaway stored in the first memory means, when the information stored in the second memory means is abnormal.

With this configuration, when the information stored in the second memory means is abnormal, it can be judged from the information related to the runaway whether the abnormal state has been generated by the past runaway or by another sporadic cause, thereby judging whether the subsequent automatic restoration is carried out. Consequently, the possibility that the information stored again becomes abnormal as a result of the automatic restoration can be entirely eliminated thereby making it possible to prevent the loss of the information.

According to the invention, (1) It becomes relatively easy to identify the cause of runaway thanks to the information related to runaway.

(2) It is possible, for example, to prohibit the automatic restoration when the runaway has been detected more than a specified number of times, thereby making it possible to avoid repeating the detection of runaway due to the repeated automatic restoration.

(3) Since it becomes possible to conjecture the cause of the runaway and therefore, it becomes possible to remove the cause of the runaway by inhibiting the use of a specific operation mode in which the runaway is generated when it can be predicted that runaway would occur in the specific operation mode.

(4) It is possible to some extent to predict or specify the cause of the runaway. On the basis of this, it is also possible to predict the danger thereof and avoid the danger beforehand. In addition, unless the cause of the runaway is specified, it is possible to inhibit the automatic restoration of the apparatus when it is judged that the runaway is generated at a frequency of a definite value so that the danger of causing the runaway to recur due to an inadvertent automatic restoration can be eliminated.

(5) When the automatic restoration carried out by the information related to the runaway would generate a fatal damage to the memory, an inadvertent automatic restoration can be avoided thereby eliminating the need of a special hardware and software for the protection of the memory.

The advantages can be achieved without causing much load on the hardware, making it possible to carry out the automatic restoration of a high degree of safety and controlling the apparatus safely.

Furthermore, in the invention, the processing after detecting the runaway is simple and does not take much time even when the processing is carried out in the form of a program, thereby making it possible to carry out the processing quickly. When the processing is carried out by hardware such as a counter, the processing can be achieved without causing much load on the hardware.

Furthermore, in the invention, since an object of control varies depending on operation modes and the degree of danger of the runaway also varies with the object of control, it is more rational to decide whether or not the automatic restoration is carried out depending on the operation mode at the time when the runaway was detected. In addition, a processing corresponding to the operation mode can be carried out so that operation modes unrelated to the runaway are executable and the operation efficiency of the apparatus is improved.

Furthermore, in the invention, since the operation can be prohibited only in a specific operation mode, the downtime of the apparatus can be minimized and the safety of the apparatus can be ensured more reliably.

Furthermore, in the invention, since the degree of danger for the apparatus can be estimated, it becomes possible to carry out an appropriate process for the operation control thereby making it possible to carry out the automatic restoration from the runaway, which will lead to an improvement of safety.

Furthermore, in the invention, since it is possible to judge whether or not an abnormal state of the information stored in the second memory is due to the runaway and accordingly to decide whether nor not the automatic restoration is carried out, it is possible to prevent abnormal states from generating in stored information by the recurrence of the runaway, thereby making it possible to protect the information and giving a sufficient assurance to the information to be protected.

BRIEF DESCRIPTION OF THE DRAWINGS

Other and further objects, features, and advantages of the invention will be more explicit from the following detailed description taken with reference to the drawings wherein:

FIG. 2 is an overview of the copying machine;

FIG. 3 is a front view of the copying machine with the door open;

FIG. 27 is a flowchart of a runaway detection and restoration in image forming mode of the runaway detection/restoration device according to a fifth embodiment of the invention.

DETAILED DESCRIPTION OF THE PREFERRED EMBODIMENTS

Figure 1:
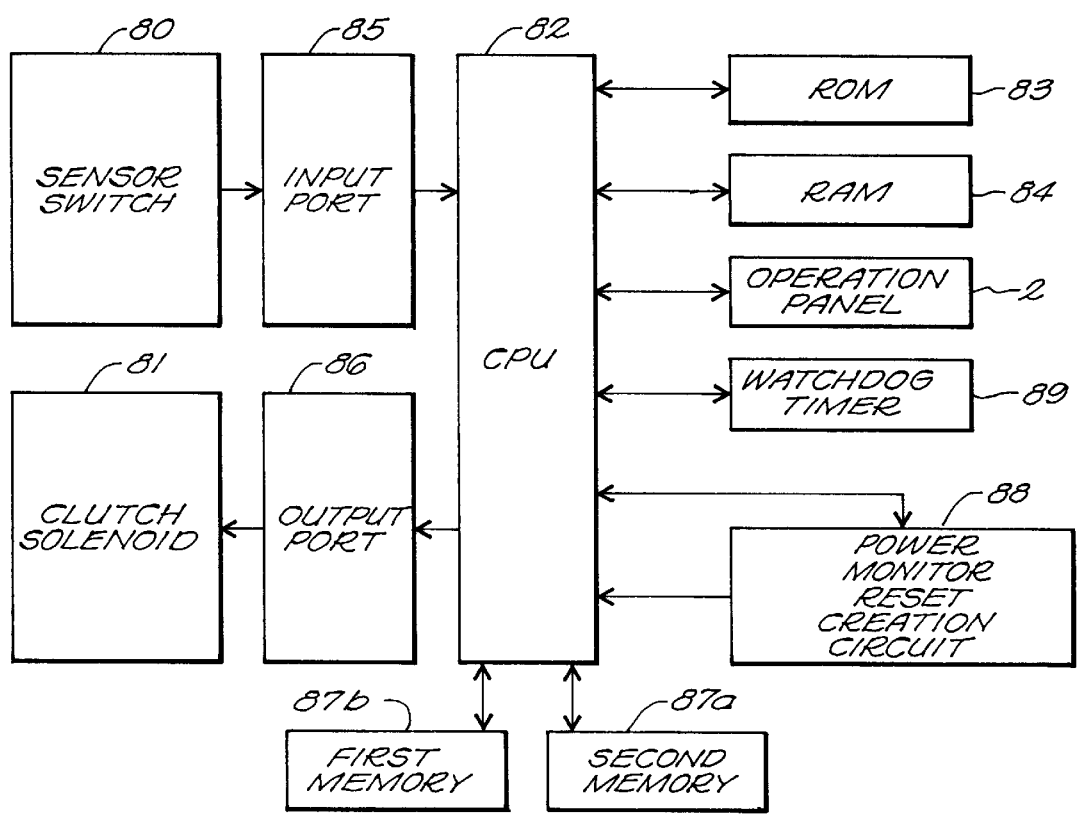
FIG. 1 is a control block diagram of a copying machine of the invention.

Now referring to the drawings, preferred embodiments of the invention are described below.

Figure 4:
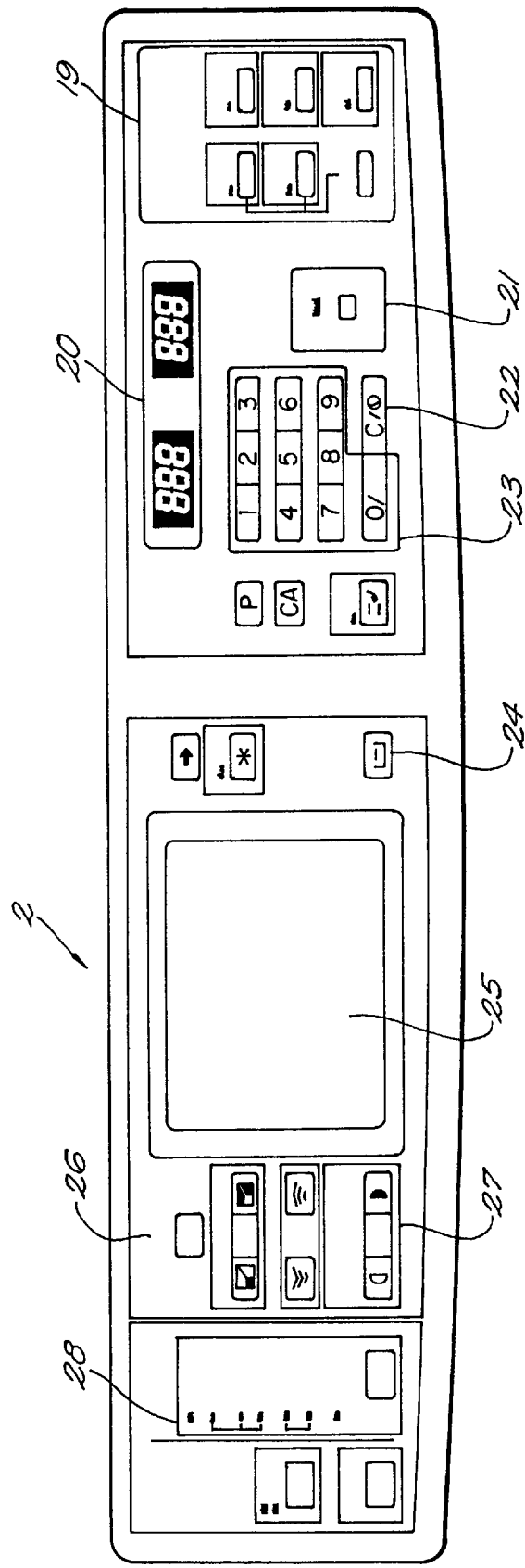
FIG. 4 is a plane view of an operation panel.

As an apparatus provided with a runaway detection/restoration device according to a first embodiment of the invention, an analog copying machine equipped with an automatic document feeder will be taken as an example. FIG. 2 shows an overview of the copying machine, FIG. 3 shows a front view of the copying machine with the door open, and FIG. 4 shows a plane view of an operation panel. In FIGS. 2 through 4, numeral 1 denotes a double-sided document feeder (RADF), 2 denotes an operation panel, 3 denotes a document stage, 4 denotes a manual feeding tray, 5 denotes an auxiliary tray, 6 denotes a power switch, 7 denotes a front cover, 8 denotes a toner recovery container housing section, 9 denotes a left side cover, 10 denotes a toner box, 11 denotes a document setting stage, 12, 13 and 14 denote paper feeding trays, 15 denotes a fixing section, 16 denotes a photoreceptor (OPC), 17 denotes a static charger, 18 denotes a double-side tray section, 19 denotes a special function keypad, 20 denotes a copy count indicator, 21 denotes a start key, 22 denotes a clear/stop key, 23 denotes a number of sheets setting key, 24 denotes a tray selector key, 25 denotes an LCD display, 26 denotes a magnification selector key, 27 denotes a darkness selector key and 28 denotes a document copy selector key.

Figure 5:
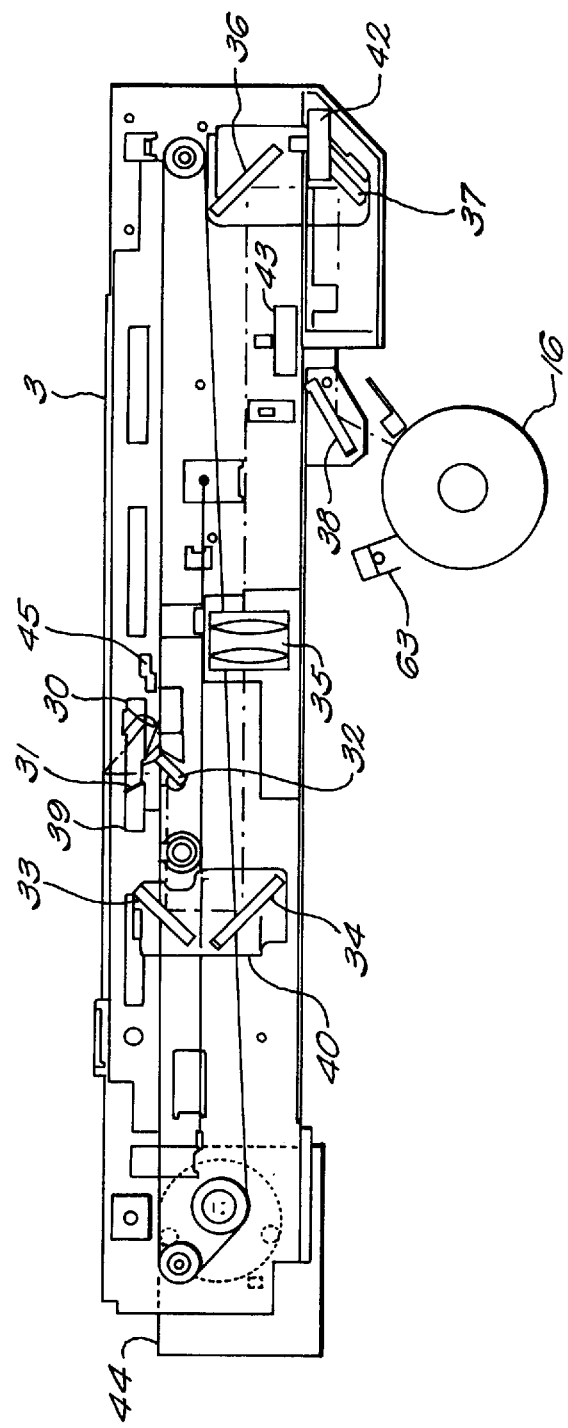
FIG. 5 is a structural diagram of an optical section.

FIG. 5 shows a structural diagram of an optical section as the image reading device. In FIG. 5, numeral 30 denotes a copy lamp, 31 denotes a reflector, 32, 33 and 34 denote mirrors, 35 denotes a fixed-focus lens, 36, 37 and 38 denote mirrors, 39 denotes a copy lamp unit, 40 and 41 denote mirror base units, 42 denotes a lens drive motor, 43 denotes a mirror base drive motor and 44 denotes a mirror motor. The optical section scans a document placed on the document stage 3 by moving a light source in the slit exposure process thereby carrying out an exposure on the photoreceptor 16. A contrast of the image is adjusted by controlling the light intensity of the copy lamp. When reading the image, the light intensity of the copy lamp 30 is controlled so that a homogeneous copy image can be obtained according to an output from an automatic exposure sensor 45 which detects the contrast of the image.

Figure 6:
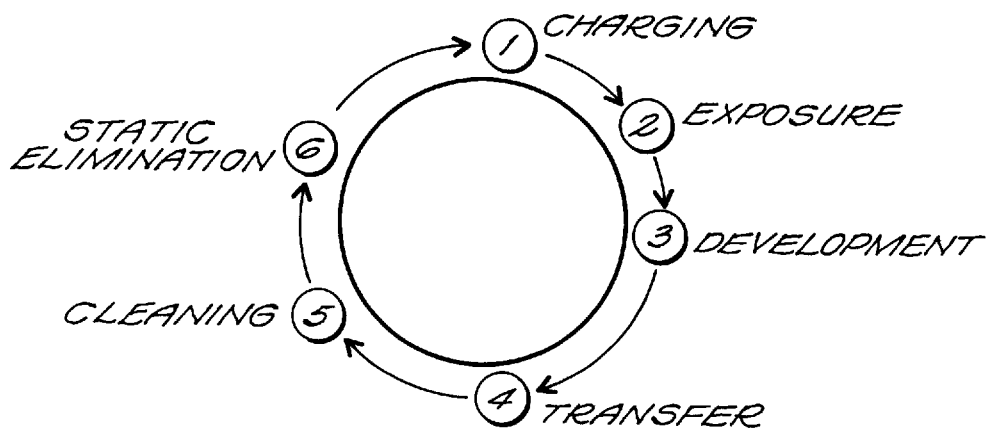
FIG. 6 is a process chart of image forming.

This copying machine is an indirect electrostatic process copying machine wherein Carlson process of forming the image on the photoreceptor 16 as a latent image is employed. Because plain paper is used as the copy paper P and five basic processes of charging, exposure, development, image transfer and static elimination and the photoreceptor 16 are repeatedly used as shown in FIG. 6, an electrostatic latent image is formed and developed on the repeatedly usable photoreceptor 16 through six processes including a cleaning process where the photoreceptor 16 is cleaned after transfer, thereby transferring the image as a visible image (toner image) onto the copy paper P and copy the document indirectly.

The photoreceptor 16 is made in a drum shape and comprises a photoconductor or a photo-semiconductor, while using OPC (organic photo-semiconductor) as the photo-semiconductor in particular, having such a property that behaves as an insulator when not exposed to light and decreases the electric resistance to show conductivity when exposed to light (photoconductivity). The photoreceptor 16 is made by laminating a pigment layer 51 and an OPC layer 52 successively on an aluminum drum 50.

Figure 7:
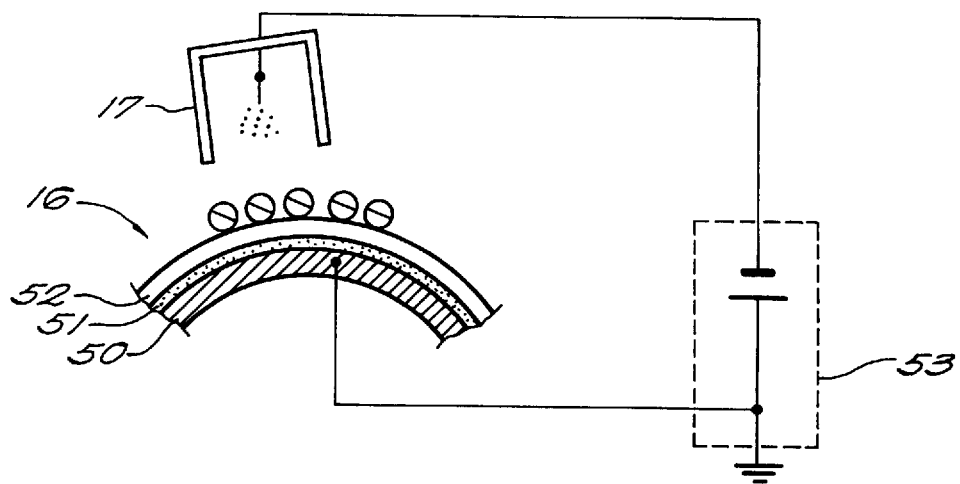
FIG. 7 is a view explaining a charging process.

Now the process of forming an image will be described in detail. First, in the charging process, Scorotoron process is employed wherein the surface of the photoreceptor 16 is charged uniformly to a certain potential, so that a negative charge is uniformly applied to the surface of the photoreceptor 16 by the negative corona discharge of the charger 17 as shown in FIG. 7. The surface potential of the photoreceptor 16 is controlled by the voltage of a screen grid, thereby keeping the same potential as the grid voltage. In FIG. 7, numeral 53 denotes a high-voltage unit.

Figure 8A:
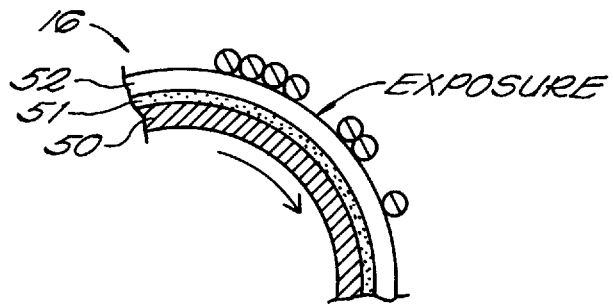
FIG. 8A is a view explaining a exposure process.
Figure 8B:
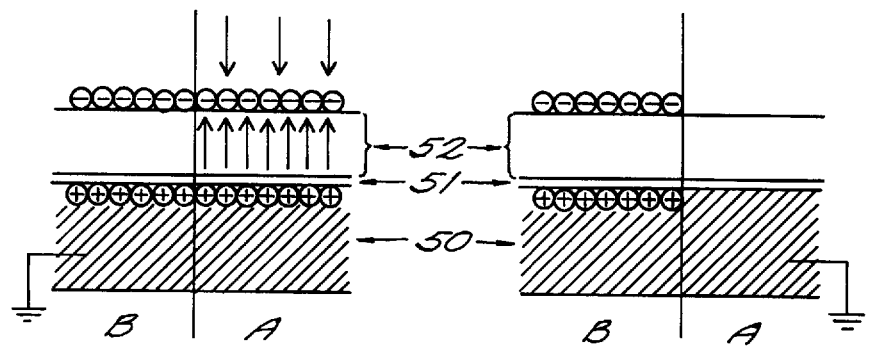
FIG. 8B is a view showing the surface of a photoreceptor during exposure.
Figure 9:
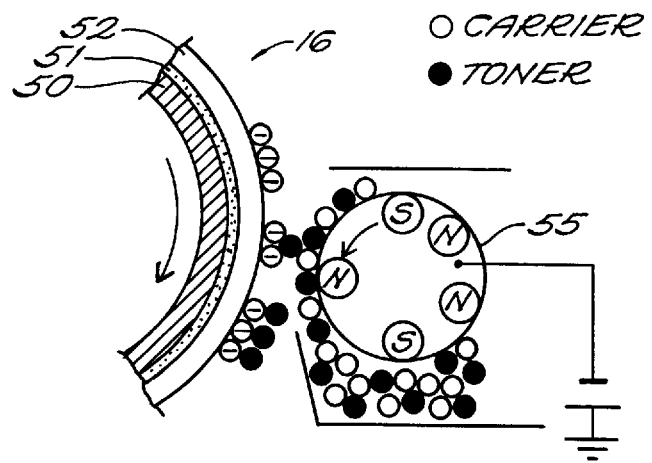
FIG. 9 is a view explaining a developing process.

In the exposure process, an optical image of the document is projected through the mirrors 32, 33, 34, 36, 37, 38 and the lens 35 onto the photoreceptor 16 by the copy lamp 30, so that the surface resistance of the photoreceptor 16 decreases at a portion exposed to light (bright portion of document) A as shown in FIG. 8 thereby eliminating the negative charge. The negative charge remains at a portion not exposed to light (dark portion of document) B. Consequently, an electrostatic latent image corresponding to the contrast of the document is formed on the surface of the photoreceptor 16.

In the development process, 2-component magnetic brush development process is employed wherein a carrier is charged with a negative bias voltage from an MG roller 55, while the toner is charged positively by the friction with the rotating carrier thereby developing the electrostatic latent image formed on the surface of the photoreceptor 16 into a visible image by the toner.

Figure 10:
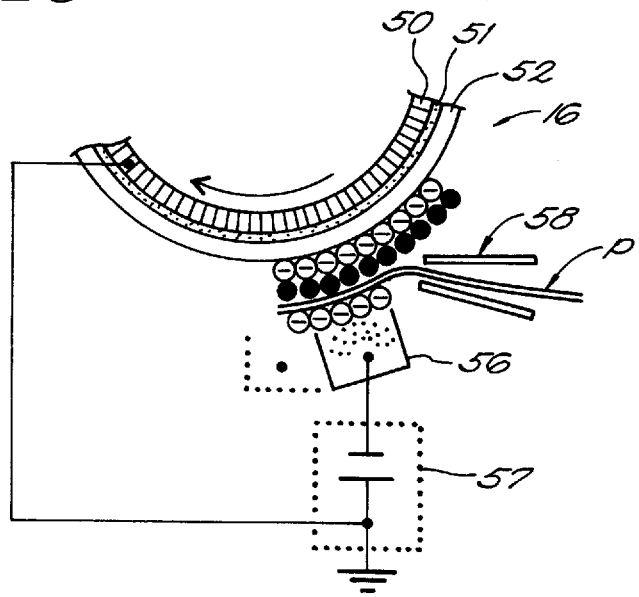
FIG. 10 is a view explaining a transferring process.

In the transfer process, a negative corona is applied to the transfer charger 56 from the rear side of the copy paper P to transfer the toner which forms the visible image on the surface of the photoreceptor 16 onto the copy paper P. In FIG. 10, numeral 57 denotes a high-voltage unit and 58 denotes a paper guide.

Figure 11:
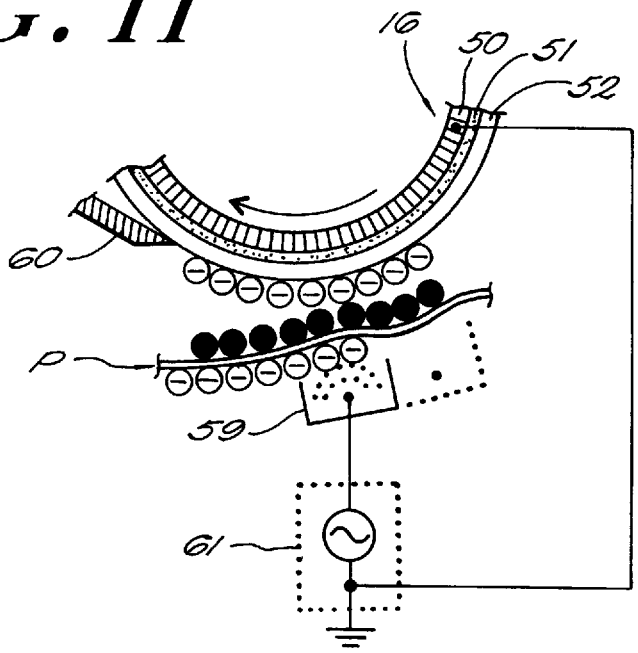
FIG. 11 is a view showing separation of copy paper.

While both the copy paper P after the transfer and the photoreceptor 16 are negatively charged, the negative potential of the photoreceptor 16 is higher and therefore an attractive force is exerted between the photoreceptor 16 and the copy paper. Thus an AC corona is applied to the copy paper P by means of the separation charger 59 thereby reducing the potential of the copy paper P to the same potential as the surface voltage of the photoreceptor 16. This removes the attractive force between the photoreceptor and the copy paper, so that the copy paper P separates spontaneously by the rigidity thereof. When the paper cannot be separated by the separation charger 59, a separation claw 60 separates the paper mechanically and forcibly. In FIG. 11, numeral 61 denotes a high-voltage unit.

Figure 12:
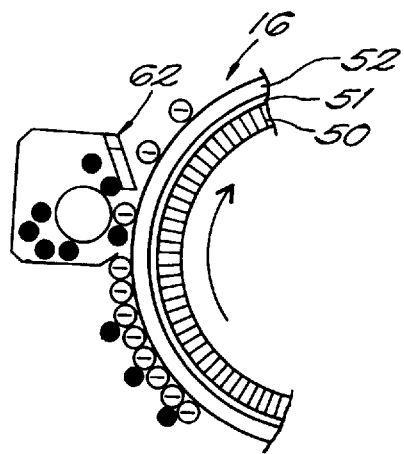
FIG. 12 is a view explaining a cleaning process.

In the cleaning process, a toner remaining on the photoreceptor 16 is cleaned by a cleaning blade 62 to collect the remaining toner as shown in FIG. 12.

Figure 13:
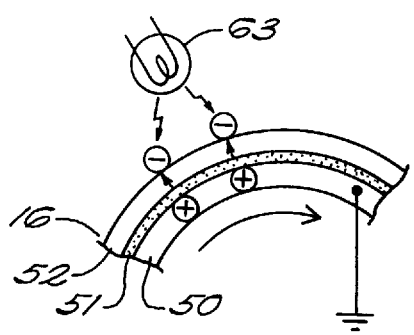
FIG. 13 is a view explaining a static eliminating process.

In the static elimination process, the photoreceptor 16 is exposed to the light from the static elimination lamp 63 to reduce the electric resistance thereby removing the remaining charge as shown in FIG. 13.

Figure 14:
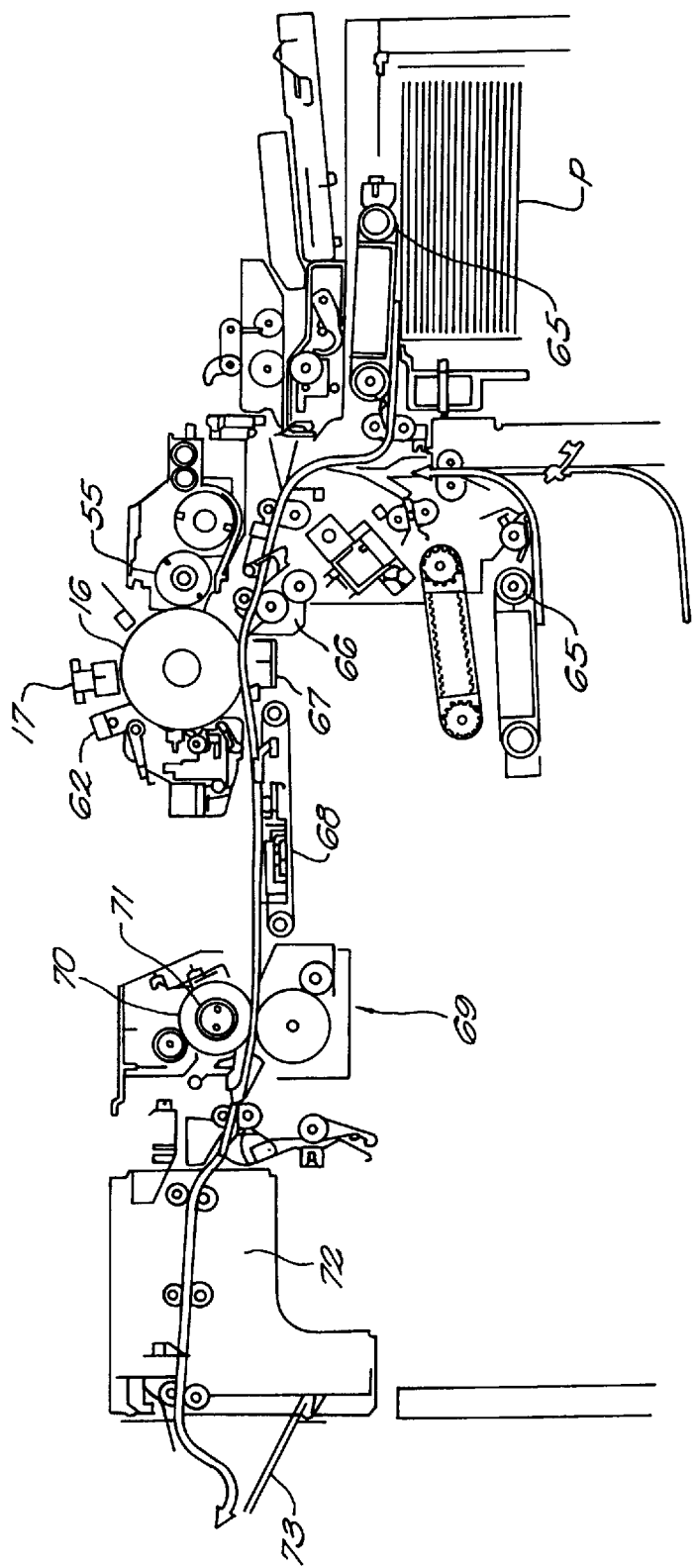
FIG. 14 is a view showing the flow of copy paper.

According to the processes described above, the copy paper P is transported as shown in FIG. 14. That is, paper is fed from one of plurality of paper feed trays 12, 13 and 14 by the paper feed roller 65, one sheet in every copy cycle, and is transported to the resist roller 66. The transported copy paper P is temporarily suspended by the resist roller 66 and then, being put in synchronization with the visible image which has been developed on the photoreceptor 16, transported to the transfer section 67 at a proper timing where the image is transferred onto the copy paper P by the transfer charger 56. After image transfer, the copy paper P which is separated from the photoreceptor 16 is transported while being sucked by a suction section 68 to be guided to the fixing section 69.

In the fixing section 69, the fixing process is carried out wherein the toner on the copy paper P is fixed on the copy paper P by heat and pressure. A heater lamp 71 incorporated in the fixing roller 70 is heated by a mechanism which is controlled separately, thereby fixing the toner onto the copy paper P by the fixing roller 70. In the fixing process, too, the heater lamp 71 is controlled to keep the surface temperature of the fixing roller 70 constant.

The copy paper P which has passed through the fixing section 69 is transported to a paper discharge section 72, and is discharged onto a discharge tray 73. In some cases, the copy paper P is then transported to a collating section where sheets of the copy paper P are collated.

Then, the copying machine is provided with a processing device which carries out a sequential control of output i1 means 81 such as motors, clutches, solenoids or the like according to an output from input means 80 such as sensors, switches or the like for the purpose of forming images, as shown in FIG. 1. The processing device consists of a microcomputer and is provided with a CPU 82, a ROM 83 which stores the control program, a RAM 84 for temporarily saving data and an input port 85 and an output port 86 to connect the input means 80 and the output means 81 to the CPU 82, while an operation panel 2 is connected thereto.

Furthermore, the copying machine also has the runaway detecting means for monitoring an abnormal state in a sequential control program used for the purpose of forming images to detect the runaway of the program. The runaway detecting means will be described later. A first memory 87*a* for storing the runaway related information detected by the runaway detecting means and second memory 87*b* for storing image formation related information are provided, with the first memory 87*a* and the second memory 87*b* being rewritable flash memory elements which are nonvolatile semiconductor memory that holds the stored information (data) even when the power of the apparatus is turned off. Three or more memories which are storing means may be provided. The CPU 82 has a judging function for judging whether the sequential control for forming images is automatically restored according to the stored information related to the runaway when a new runaway is detected. Also connected to the CPU 82 are a power monitor reset circuit 88 which carries out the reset processing of the CPU 82 when the power is turned on.

As the runaway detecting means, for example, a watchdog timer 69 is employed. Besides, the runaway detecting means which detects the runaway by a method based on the detection of the execution of undefined instruction, a method based on the detection of privilege violation and a method based on the detection of illegal access across memory boundary. The runaway detecting means is connected to an external interruption request terminal of the CPU 82, while the CPU 82 carries out the function of the runaway detecting means. When a request is made for an interruption as a result of the detection of the runaway from at least one or more runaway detecting means, the CPU 82 carries out each of the interruption processing by a program according to the request for the interruption.

Figures 15A, 15B:
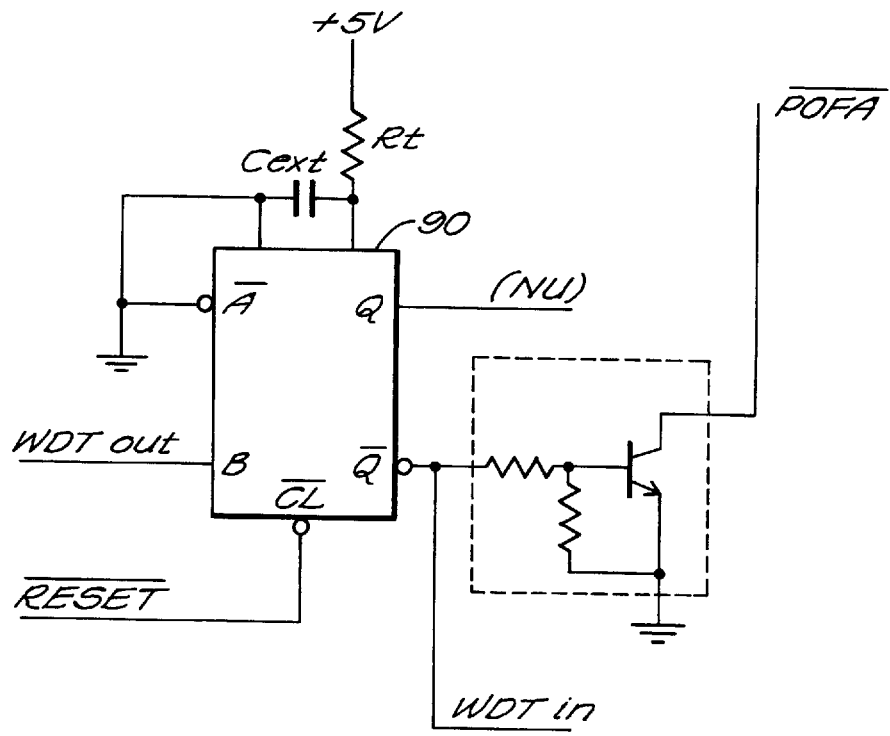
FIG. 15A is a circuit diagram of a watchdog timer.
FIG. 15B is a characteristic diagram of a multivibrator.

An example of the watchdog timer is shown in FIG. 15A. As hardware the watchdog timer is realized in a one-shot multivibrator 90 which, when an input is given to an input terminal thereof (triggered), generates a pulse of having a duration determined by a capacitor Cext and a resistor Rt and, when further triggered during generation of the pulse, generates a pulse having a certain duration further from the given timing.

Figure 16:
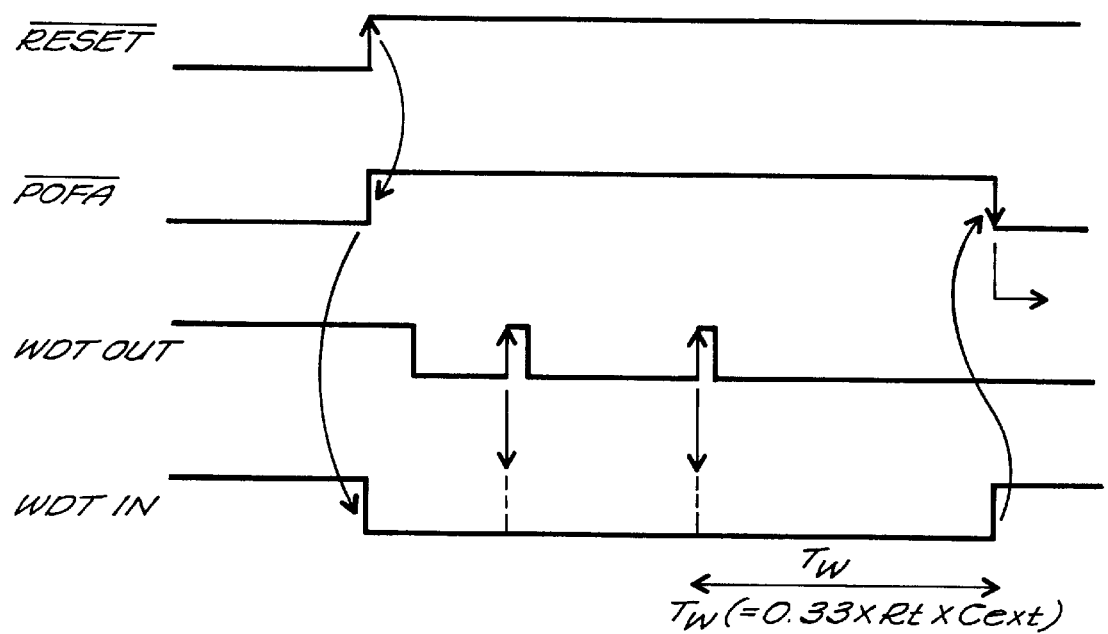
FIG. 16 is an operation time chart of the watchdog timer.

As shown in FIG. 16, the reset terminal is at a specified level (L level) when the power is normally turned on, and the CPU usually starts the processing thereof after canceling the reset, with the watchdog timer suspending the functions thereof during the reset.

When the one-shot multivibrator 90 starts operating after the reset has been canceled and no trigger is input during the specified pulse period, the pulse is terminated resulting in an inversion of the output, which is used as a watchdog timer output.

Figure 17A:
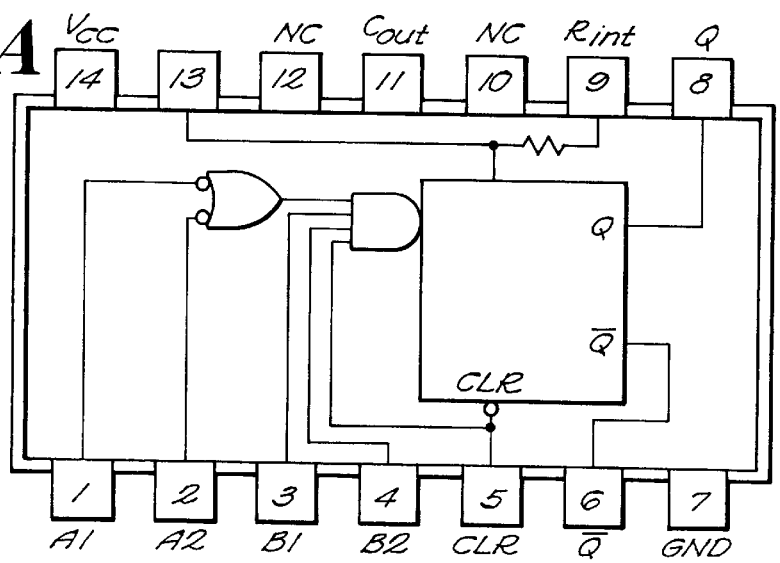
FIG. 17A is a pin assignment diagram of an IC used in the watchdog timer.
Figure 17B:
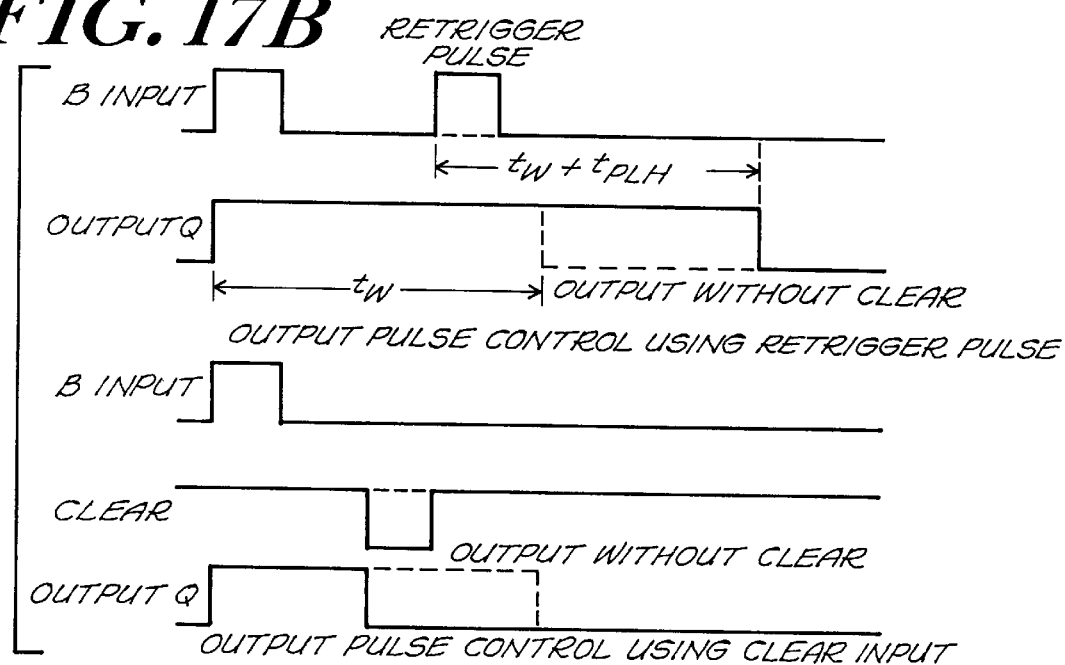
FIG. 17B is a timing chart of the IC.
Figure 17C:
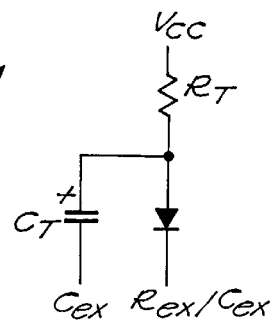
FIG. 17C is an equivalent circuit diagram of the IC.

In other words, unless a specified trigger is given to the watchdog timer during the specified pulse period after canceling the reset, the output of the watchdog timer is inverted and the detection of the inversion of the watchdog timer is regarded as the detection of the runaway of the CPU. Incidentally, data sheet of the used IC is shown in FIG. 17 for reference.

Now the runaway detecting means based on the detection of illegal memory access across boundary will be described below. This uses an address decoder for memory access, while the CPU 82 is provided with a runaway detecting circuit as shown in FIG. 18A as required so that an interruption signal is generated to the CPU 82 when the CPU 82 tries to access an area where no memory is mounted.

Figures 18A, 18B:
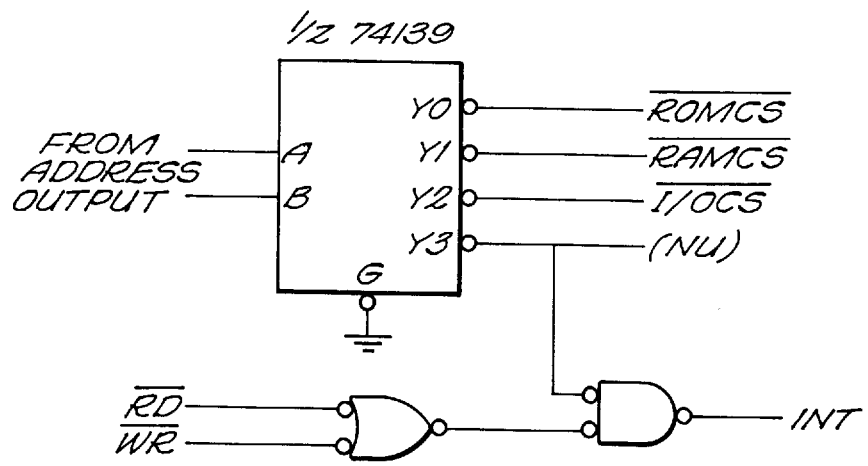
FIG. 18A is a configuration diagram of an address decoder.
FIG. 18B is a characteristic diagram of the address decoder.

In FIG. 18A, a ROMCS is a signal for accessing the ROM 83 which stores the program, a RAMCS is a signal for accessing the RAM 84 which temporarily stores data and an I/OCS is a signal for accessing the input/output port. The signals are selected according to the address signal from the CPU 82.

Furthermore, an RD is a reading access signal of the CPU 82 and WR is a writing signal of the CPU 82, which are not enabled except for when accessing the ROMCS, the RAMCS and the I/OCS. However, there is a case in which an address other than the above is accessed due to the runaway of the CPU or the like. In such a case, the address is detected with an INT signal. The INT signal is given to the interruption terminal of the CPU.

Incidentally, the runaway detecting means for detecting illegal memory access across boundary detects an attempt of accessing an area where no memory is mounted, but the means is also effective when the memory is actually mounted.

Now exception processing of the CPU will be described. The exception processing refers to an operation of the CPU which is different from the execution of normal instructions. An operation of temporarily suspending the normal instruction during the execution of the normal CPU instruction to shift to a different processing is generally referred to as the exception processing. Consequently, the detection of the runaway by the runaway detecting means constitutes a factor of the exception processing.

Factors of exception processing include (1) reset, (2) interruption, (3) trap, (4) non-packaged instruction and illegal instruction, (5) privilege violation and (6) trace, bus error, address error.

The exception processing is a series of operations of hardware following the generation of the factor, and is not the execution of a program called a handler of interruption or a trap, and a service routine. The execution of the program is none other than the execution of an ordinary program from the view point of hardware. That is, the exception processing is what is carried out by the CPU during a period from the generation of the factor until the start of the handler program.

(1) Reset

When a reset is input to the reset input terminal, the CPU unconditionally reads data written at the specified address to attempt to carry out the program from the address following the data. The reset input is different from the normal interruption is that the CPU abandons the data it has been holding (initializes) when the reset is input, and attempts to carry out the program from the top. Some CPUs give a reset output for a device other than the CPU while the other device carries out so called initialization by means of the reset output.

(2) Interruption

When an interruption factor arises during the execution of a normal instruction, the CPU temporarily interrupts the execution of the instruction and saves the address of the interrupted program and the data at the time in a specified storage area. Then the CPU reads the data written at the specified address to carry out the program starting at the address according to the data. There are a plurality of interruptions and the factors are further subdivided while the address to be accessed for reading the specified data varies depending on the factor. Therefore, it is made possible to prepare an interruption program for each case.

The interruption is different from the reset is that the interruption is based on a presumption that the execution of a normal instruction is temporarily suspended in the midway and the normal instruction is resumed after the interruption processing is ended, while reset is initialization represented at the time of turning on the power and the subsequent execution of the program.

(3) Trap

A trap refers to a process in which the exception processing is generated by means of software, and is defined as one of the CPU instructions. When encountered by the trap instruction, the CPU temporarily interrupts the execution of the program until that time in the same manner as the interruption processing to carry out the trap interruption processing.

(4) Unpackaged instruction and illegal instruction

When the CPU reads a program in an attempt to carry out the program, a code unpackaged in the CPU itself is regarded as an unpackaged instruction and the exception processing is carried out when such unpackaged code exists.

Illegal instruction is such an instruction as division by 0 which exists but is not executable (execution leads to indeterminate result) upon which exception processing is carried out.

(5) Privilege violation

A privilege violation is a process which arises when a plurality of levels are provided so that an attempt is made to carry out an instruction on a high level (state) from a low level in the execution of instructions.

(6) Trace, address error, bus error

A trace is a process for stopping a program by means of software and holding the program until some instruction is given. The trace is principally used for the debugging of the program.

An address error is an exception processing which arises when the CPU cannot read an instruction for some reason in an attempt of reading the instruction according to a certain rule. Specifically, the address error may arise when an attempt is made to read a word instruction from an odd-number address when the word instruction can be read only from an even-number address.

A bus error refers to an error which arises when an error is input to the CPU from the outside when the CPU attempts access an external device. The illegal memory access across boundary described previously can be realized by allowing the error to return to the CPU when the CPU attempts access to the outside beyond the boundary.

With respect to the contents of the exception processings from (1) through (6) described above, reference examples in actual devices are shown in Table 1 and Table 2. Table 1 shows the types and priorities of exception processings, and table 2 shows the exception processing vector tables. There is no description on the bus error in Table 2, which can be achieved by the external interruption shown in the table.

TABLE 1

| Priority | Type of exception processing | | Timing of starting exception processing |
|---|---|---|---|
| High | Reset | | Immediately started when RES terminal changes from "Low" level to "High" level. |
| | Address error | | Detected in the bus cycle of instruction fetch or data read/write, and started after the operation of the instruction which is being carried out ends. |
| | Trace | | Started every time the execution of instruction completes, when T bit of SR is "1". |
| | Interruption | | When a request for the interruption is generated, the interruption is started at the time of ending the execution of the instruction or at the time of ending the exception processing. |
| | Instruction | Illegal instruction | The illegal instruction is started an attempt is made to carry out an undefined code as an instruction. |
| | | Trap instruction | The trap instruction is started upon execution of the trap instruction. |
| Low | | Division by zero | The division by zero is started when an attempt is made to carry out the DIVXU instruction with divisor zero is attempted. |

TABLE 2

| | Vector address | |
|---|---|---|
| Factor of exception processing | Minimum mode | Maximum mode |
| Reset | 0000h~0001h | 0000h~0003h |
| — (Reserved for system) | 0002h~0003h | 0004h~0007h |
| Illegal instruction | 0004h~0005h | 0008h~000Bh |
| DIVXU instruction (division by zero) | 0006h~0007h | 000Ch~000Fh |
| TRAP/VS instruction | 0008h~0009h | 0010h~0013h |
| — (Reserved for system) | 000Ah~000Bh | 0014h~0017h |
| | ʃ | ʃ |
| | 000Eh~000Fh | 001Ch~001Fh |
| Address error | 0010h~0011h | 0020h~0023h |
| Trace | 0012h~0013h | 0024h~0027h |
| — (Reserved for system) | 0014h~0015h | 0028h~002Bh |
| External interruption NM1 | 0016h~0017h | 002Ch~002Fh |
| — (Reserved for system) | 0018h~0019h | 0030h~0033h |
| | ʃ | ʃ |
| | 001Eh~001Fh | 003Ch~003Fh |
| TRAPA instruction (16 causes) | 0020h~0021h | 0040h~0043h |
| | ʃ | ʃ |
| | 003Eh~0003Fh | 007Ch~007Fh |
| External and internal interruption | 0040h~0041h | 0080h~0083h |
| | ʃ | ʃ |
| | 009Eh~009Fh | 013Ch~013Fh |

Figure 19:
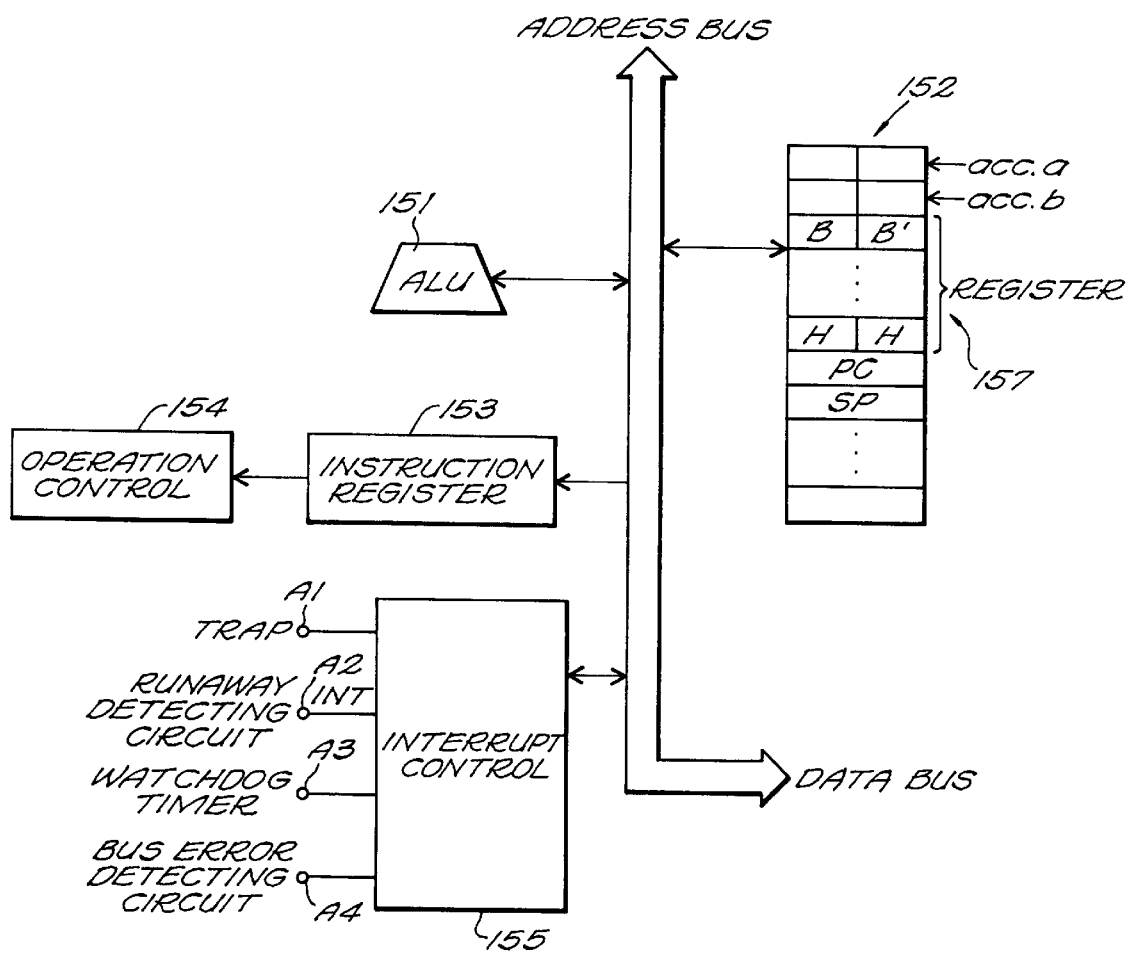
FIG. 19 is a block diagram showing an internal structure of CPU 82.

Now an internal structure of the CPU 82 according to this embodiment will be described with reference to FIG. 19.

The CPU 82 is constructed by including an ALU (arithmetic logic unit) 151, a general purpose register 152, an instruction register 153, an arithmetic operation control circuit 154, an interruption control circuit 155 and interruption terminals A1 through A4. The ALU 151 is controlled by the arithmetic operation control circuit 154 to carry out the logical operation and arithmetic operation of the data stored in the general purpose register 152. The general purpose register 152 is constructed of accumulators acc.a and acc.b, a register group 157 comprising two registers, for example a pair of registers B and C, a program counter PC and a stack pointer SP. The instruction register 153 retrieves instructions from the external memory, the ROM 83 and RAM 84 in this case, and stores them temporarily. The operation control circuit 154 controls the ALU 151 and controls data storage of the general purpose register 152 according to the instruction taken into the instruction register. The interruption control circuit 155 processes the retrieval of vector address shown in Table 2 into the CPU 82 according to the interruption request given through the interruption terminal A1, A2, A3 or A4 and the interruption request taking place in the CPU 82. The vector addresses shown in Table 2 are stored in the ROM 83 installed outside the CPU 82.

input evaluation of the input (1) and does not invert the output as far as this level is not exceeded, and this nature is used to delay the response to the output (2) of the inverter 100 from the time at which the power is turned on. The delay time Td can be freely set by means of the time constant CR.

The output (2) of the inverter 100 is further input to an inverter 101 and is inverted by the inverter 101 to be output. An output (3) of the inverter 101 is further input to an OR gate 102 to be processed in the negative logic and is subjected to the reset input. At this time, an output (4) of the CPU remains "H" and the output from the output (3) of the inverter 101 is input as it is to the reset input of the CPU 82.

Next, the timing at which the CPU 82 resets itself with its own program via the output port of the CPU 82 itself is such that when the output (3) of the inverter 101 remains "H", the CPU 82 outputs "L" via the output port incorporated in the CPU. The "L" signal is input to the OR gate 102 to be added to the reset input of the CPU 82 itself.

As the reset processing of the CPU 82, a normal output port is set to the input setting to provide a high output impedance. At this time, since the CPU 82 output (4) is pulled up to "H" by a resistor, the CPU 82 output (4) turns from "L" to "H" thereby starting the reset processing of the CPU 82.

TABLE 3

| Detection | Non-mounted instruction | Illegal instruction | Privilege violation | Address error | Bus error | Watchdog timer | Illegal access across boundary |
|---|---|---|---|---|---|---|---|
| Rating | A | B | C | D | E | F | G |

TABLE 4

| Mode/ status | Clutch ON | Solenoid ON | Fixing heater ON | Copy lamp ON | Scan motor ON | Drive motor ON | High Voltage ON |
|---|---|---|---|---|---|---|---|
| Rating (H) | +1 | +1 | +1 | +1 | +1 | +1 | +1 |
| | | | | In warming up | Ready for copying | In copying | RADF in operation | Sorter in operation |
| | | | | +1 | +1 | +1 | +1 | +1 |

Figure 21:
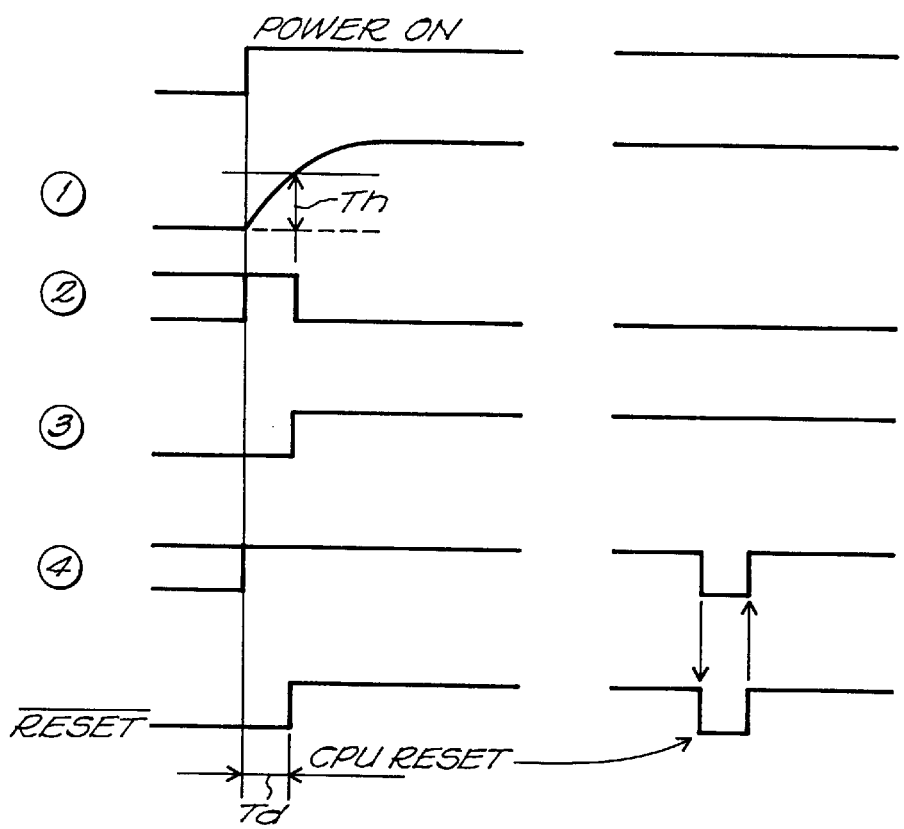
FIG. 21 is a timing chart of the re-initialization operation control circuit which is automatic restoration means.

Next, An example of the re-initialization setting operation control circuit which is automatic reset restoration means for automatically restoring the copying machine is shown in FIG. 21. This connects an output from the CPU 82 to a reset input port of itself via an output port 103. Therefore, what the CPU does for the re-initialization setting operation control is only to deliver a reset signal to the output port 103, and the program only suspends at the time and waits for reset interruption. Namely the CPU carries out a resetting operation similar to that when turning on the power and makes the program restarted from the top.

Furthermore, it is also possible to carry out the same operation without passing through the output port 103, and it can be realized by allowing the operation to Jump directly to the address which indicates the reset initialization setting program.

Figure 22:
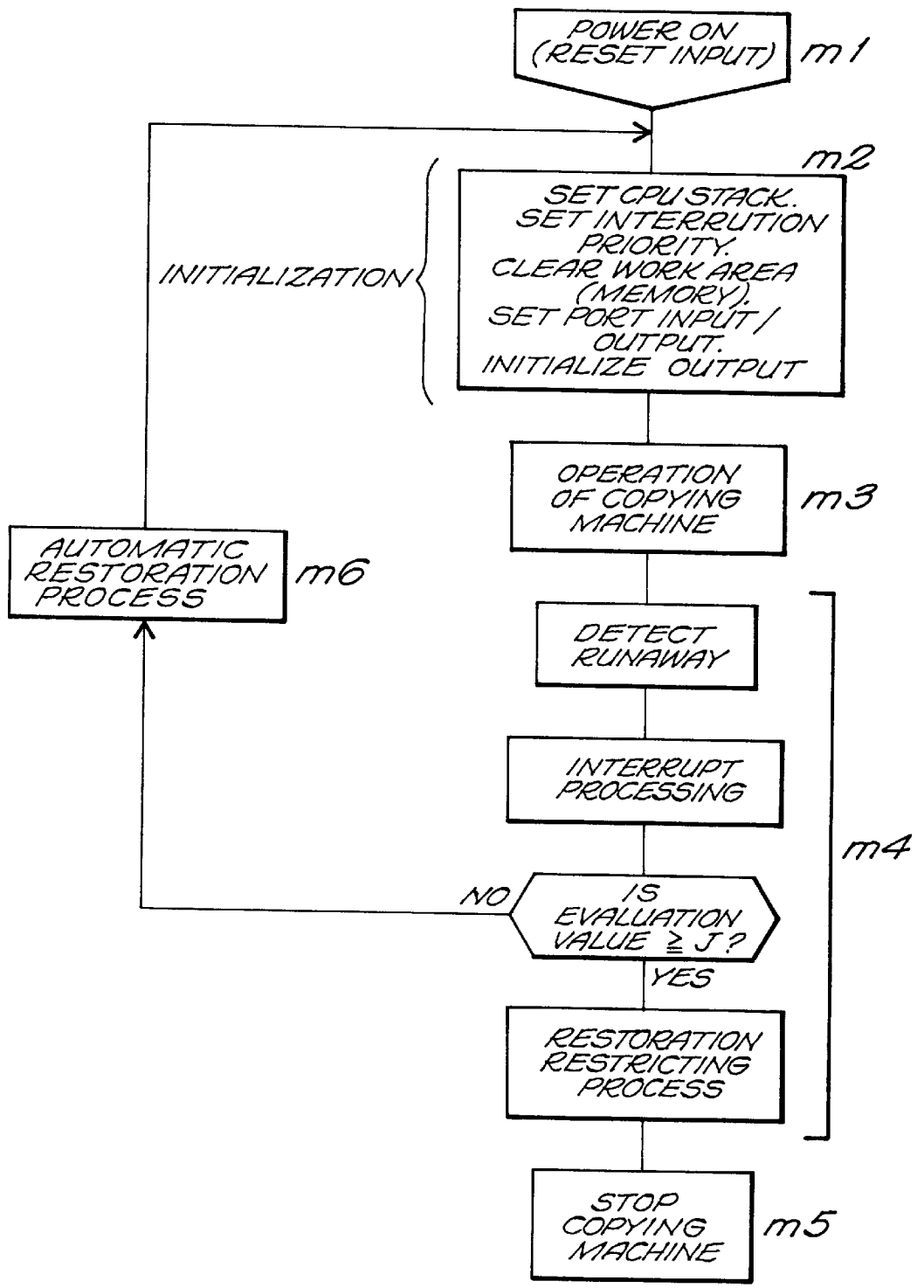
FIG. 22 is a flowchart explaining the processing operation of the runaway detection/restoration device.

The operation of the above circuit will be described with reference to the timing chart shown in FIG. 22. First, when power is turned on, the application of voltage Vcc causes an input (1) of an inverter 100 to gradually rise from "L" to "H" with a time constant of CR. The signal which has risen to H level is inverted by the inverter 100 from "H" to "L". At this time, the inverter 100 has a certain threshold level Th for the Now, a processing operation of the runaway detection/restoration device will be described with reference to the flow chart shown in FIG. 22. At step m1, power is supplied to the copying machine equipped with the runaway detection/restoration device while the reset terminal of the CPU 82 receives a signal with a delay time Td as described above supplied thereto.

At step m2, the copying machine equipped with the runaway detection/restoration device is initialized. As shown in FIG. 22, the stack setting for the CPU 82 and other operations are carried out. At step m3, the copying machine operates under the control of the CPU 82 according to the control program which is stored in the ROM 83.

At step m4, the interruption processing of the CPU 82 is carried out with respect to the runaway of the copying machine, namely the detection of the runaway of the CPU 82. It is judged whether the evaluation value calculated in the interruption processing of the CPU 82 is equal to or greater than the value of a predetermined constant J. When the evaluation value is equal to or greater than the predetermined constant J, the restoration restricting processing of the copying machine is carried out and the procedure goes to step m5. On the other hand, when the evaluation value is less than the value of a predetermined constant J, the procedure goes to step m6. Detailed description of the step m4 will be made later.

At step m5, the restoration operation of the copying machine is stopped and the copying machine is not operated until the factor of the runaway is removed. Such a configuration may also be employed that, after displaying an alarm on the LCD display 25 of the copying machine to notify the user, the restoration processing of the copying machine is carried out by the re-initialization setting operation control circuit.

At step m6, the restoration operation of the copying machine is carried out, and the process returns to step m2. As described previously, when the CPU 82 outputs the reset signal to the output port, the re-initialization setting operation circuit inputs the reset signal to the reset terminal of the CPU 82 so that initialization is carried out again as shown in step m2. As described previously, initialization may also be done by designating the address which directly indicates the reset initialization setting program by means of software, without installing the re-initialization setting operation circuit.

Figure 18C:
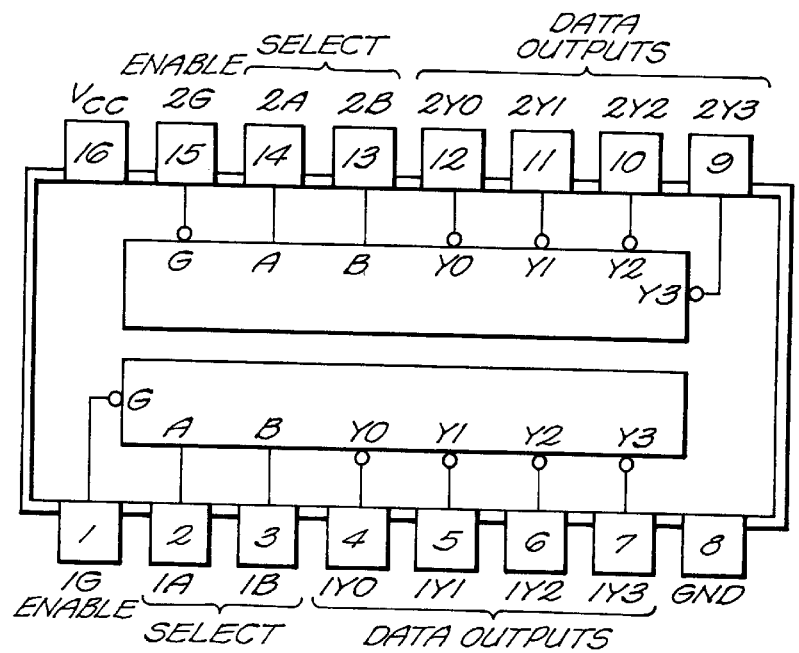
FIG. 18C is a pin assignment diagram.
Figure 18D:
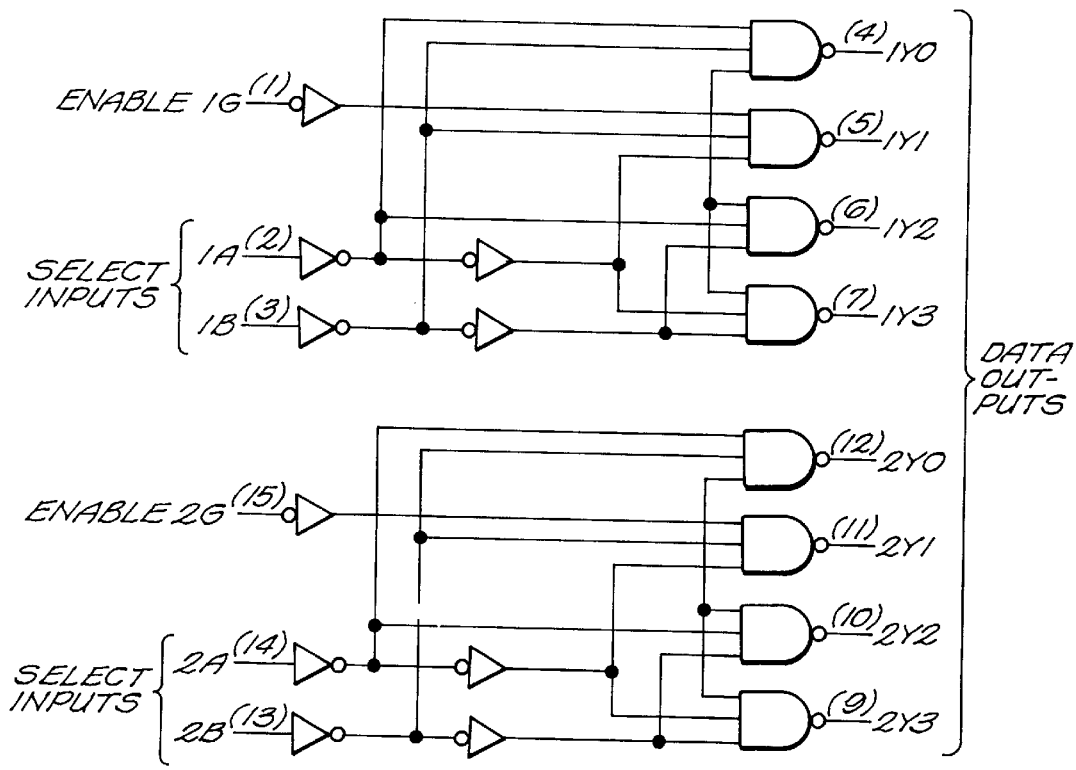
FIG. 18D is a logical circuit diagram.

The interruption processing with respect to the runaway detected by the runaway detecting means will now be described below with reference to the flowchart shown in FIG. 23. The interruption processing with respect to this runaway detection corresponds to step m4 of the flowchart of FIG. 22 as described previously. The runaway detecting means comprises seven runaway detecting means components as shown in Table 3. The runaway detecting means which detects the unpackaged instruction, the illegal instruction, the privilege violation and the address error is incorporated in the CPU 82 and requests an interruption when the means detects runaway. In addition, a bus error detecting circuit not shown in FIG. 22 which detects the bus error, the watchdog timer 89 and the runaway detecting circuit as shown in FIG. 18 for detecting the illegal memory access across boundary are connected to interruption terminals A2 through A4, respectively so that the circuits and the watchdog timer 89 output an interruption signal to the interruption terminals A2 through A4 respectively to request the interruption upon detecting the runaway.

At step n1, the runaway detecting means which has detected the runaway requests an interruption to the CPU 82. When the interruption is requested to the CPU 82, the interruption control circuit 155 carries out a specified process predetermined for each interruption request. The predetermined process is a process of capturing a vector address which is predetermined for each interruption request as shown in Table 2. For example, when an interruption signal is given to the interruption terminal A3 from the runaway detecting circuit which detects the illegal memory access across boundary, the interruption control circuit 155 captures the vector address "0040h" of minimum mode shown at the last column of Table 3 which is predetermined for this interruption request.

At step n2, the vector address captured by the interruption control circuit 155 is given to the ROM 83 via the address bus so that data such as the instruction stored in the ROM 83 is read and, according to the data such as the instruction, the interruption control circuit 155 stores the evaluation values A to G given in table 3 from the first memory 87a via the data bus into the accumulator acc.a of the general purpose register 152. For example, when an interruption request is made from the runaway detecting circuit which detects the illegal memory access across boundary, the evaluation value G is stored in the accumulator acc.a. While the evaluation values A through G given in Table 3 are all defined as "+1", the evaluation values A through G may be weighed with different values.

At step n3, the interruption control circuit 155 stores the evaluation values which have been determined so far and stored in the first memory 87a in the accumulator acc.b. Through the control by the interruption control circuit 155, the evaluation values stored in the accumulator acc.a and the evaluation values stored in the accumulator acc.b up to the present are added in the ALU 151 with the sum being stored in the accumulator acc.a.

At step n4, an evaluation value H determined by the operation status of the copying machine when an interruption request is made, namely when the runaway is detected, is determined and stored in the accumulator acc.a. As shown in FIG. 22, the evaluation value H is calculated by using ratings which are predetermined according to the operation status or an operation mode as to whether the loads installed in the copying machine are being driven. When the operation status when runaway is detected is "copy lamp ON" and "scan motor ON", for example, two ratings "+1" corresponding to the respective operation states are added to determine the evaluation value H "2". Data in Table 4 is stored in the first memory 87a while relating the respective operation states and the ratings. While the ratings of the operation states are all set as "+1" in Table 4, they may be set differently for each of the different operation states.

At step n5, the evaluation value which has been determined in step n3 and stored in the accumulator acc.a and the evaluation value H determined for the operation status which is stored in the accumulator acc.b are added to the ALU 151 by the control of the interruption circuit 155, with the sum being stored in the accumulator acc.a. In addition, the calculated evaluation value is stored in the accumulator acc.a and is also stored in the first memory 87a by the control of the interruption circuit 155.

At step n6, a predetermined constant J stored in the first memory 87a is read by the interruption control circuit 155 and s stored in the accumulator acc.b. The evaluation values stored in the accumulator acc.a is judged by the ALU 151 to see whether they are equal to or greater than the predetermined constant J stored in the accumulator acc.b. When the evaluation values are equal to or greater than the constant J, the process goes to step n7. When they are smaller than the constant J, the process goes to step n8.

Figure 20:
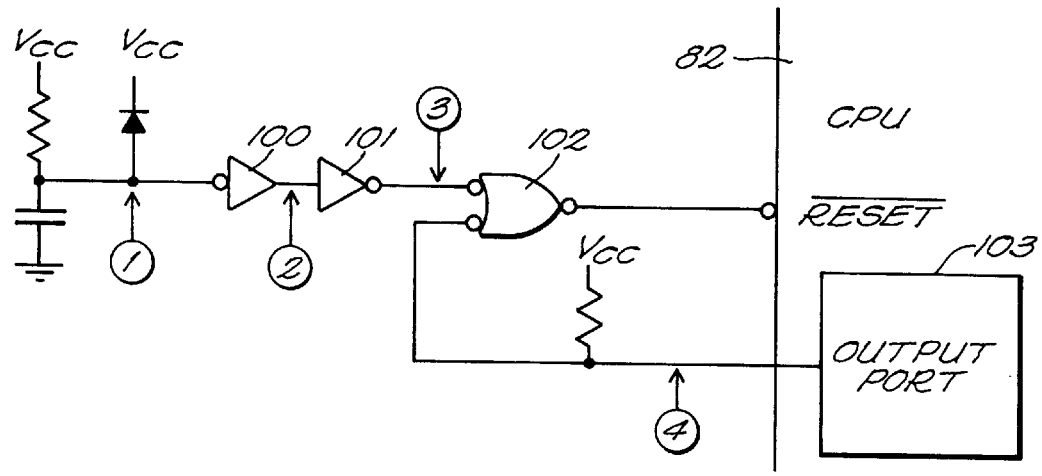
FIG. 20 is a circuit diagram showing re-initialization operation control circuit which is automatic restoration means.

At step n7, the copying machine is allowed to be suspended in operation without automatic restoration. Otherwise, the copying machine is allowed to be automatically restored by displaying an alarm on the LCD display part 25. At step 8, the re-initialization setting operation control circuit shown in FIG. 20 for the automatic restoration of the copying machine carries out in the CPU 82 a reset operation which is similar to the operation carried out when power of the copying machine is turned on thereby executing the execution program of the copying machine from the outset.

In addition, when the automatic restoration of the copying machine is restricted, an alarm display (runaway detection display) is indicated on the operation panel. While a message is displayed with LCD, it may also be an LED indication or a warning. This is intended to give a warning to the user and urge the user to remove the trouble. With this configuration, it is possible to transmit the reason why automatic restoration is not carried out explicitly to the outside preventing the user from harboring distrust for no purpose.

Consequently, all operations of the plurality of runaway detecting means of the CPU are processed as an interruption to the CPU, so that different types can be distinguished as in the case of the internal interruption of the CPU. Therefore, it can be determined by which detecting means an interruption has been made. Furthermore, during the interruption processing of the CPU, it can be determined at which stage of the sequence processing of the copying machine the interruption (detection of runaway) was made, by observing the status of the apparatus and the mode at the time.

As described above, the copying machine can be safely controlled by deciding whether or not the copying machine is to be allowed to be automatically restored on the basis of the information during the interruption (when detecting the runaway) and the information at the time of the previous runaway detection stored in the memory. That is, since the past history of the runaway is held, the probability of runaway generation of the CPU after the automatic restoration can be predicted, which has been impossible, by means of the history information.

The runaway detection/restoration device according to a second embodiment of the invention will now be described below. A configuration of the runaway detection and restoration device according to the second embodiment is the same as that of the runaway detection/restoration device according to the first embodiment. Thus, a description thereof will be omitted. The runaway detection/restoration device according to the second embodiment is characterized in that the means restricts the automatic restoration when the number of times the runaway detecting means has detected the runaway is equal to or greater than a predetermined constant J in the interruption processing of the CPU 83, namely at step m4 of the flowchart shown in FIG. 22.

Figure 23:
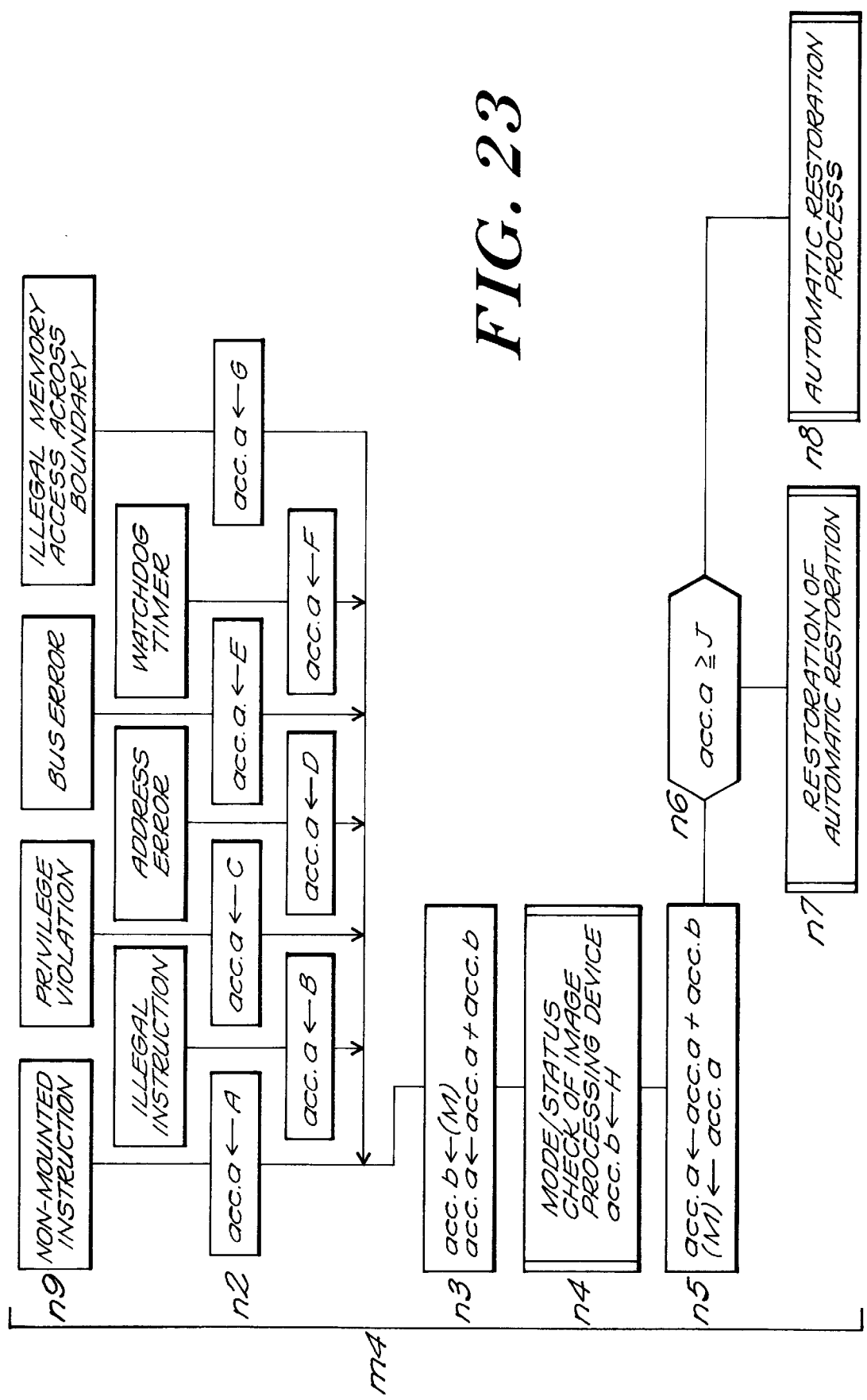
FIG. 23 is a flowchart explaining the processing operation of the runaway detection/restoration device according to a first embodiment of the invention.

Since the detection of runaway and interruption processing operation of the runaway detection/restoration device according to this second embodiment is similar to that of a case when all evaluation values A through G are set to 1 in step n2 of the flow chart shown in FIG. 23 of the first embodiment described previously and step n4 is omitted, a detailed description thereof will be omitted. Consequently, the CPU 82 compares the counting the frequency of interruptions, the number of times of interruptions and constant J by the interruption processing. Such a configuration may also be employed in which a counter installed inside or outside of the CPU 82 and receives an output from the runaway detecting means, a circuit which outputs a signal to the reset terminal of the CPU 82 when the value of count by the counter is equal to or greater than the constant J are provided.

In the case of this configuration, when a constant J is set to 1, J being a value for judging whether or not the automatic restoration is to be carried out, the automatic restoration will be restricted after detecting the runaway only once. This means that the automatic restoration is virtually prohibited and no automatic restoration can be carried out. Even when the runaway is resulted from a sporadic (accidental) factor, the copying machine shuts down leading to a maximum down time. Thus the evaluation point J is preferably 2 or greater.

In case of J=2, the detection of the first runaway is overlooked with the result that the automatic restoration is restricted upon the second detection of the runaway. The runaway of the CPU is often generated by the complication of two or more factors. The factors of the runaway generation are more than one in many cases. Consequently, there is a low possibility that the runaway is resulted from the same factor in the first and the second runaway detection. It is presumed that there is a high probability that both the first and the second runaway have been resulted from sporadic (accidental) factors. For these reasons, it is thought that the evaluation point J of 3 or more is more valid.

Furthermore, when the value of count is stored in the first memory 87a, the count number will represent the number of times the runaway has been detected. Thus it is made possible to protect the CPU from the danger of the recurrence of the runaway until the counter which counts the count value is cleared thereby making it possible to avoid a fatal accident of the copying machine as a result of the runaway.

Next, the runaway detection/restoration device according to a third embodiment of the invention will now be described. The runaway detection/restoration device according to the third embodiment has the same configuration as that of the first embodiment and therefore description will be omitted. The runaway detection/restoration device according to the third embodiment restricts the automatic restoration when the probability (an interval between incidents) of the next runaway is not lower than a predetermined probability in the interruption processing of the CPU 83, namely at step m4 in the flowchart shown in FIG. 22. It is common that the copying machine provided with the runaway detection/restoration device according to the third embodiment has a function of storing the number of copies, and other apparatuses also have some means for estimating the life (service period). Therefore, when the runaway is detected, an interval from the previous detection of the runaway can be recognized depending on the number of copies at the time of the runaway generation, with the interval being regarded as the probability that the CPU generates the runaway next time.

Now the processing operation of the runaway detection/restoration device will be described by using the flow chart shown in FIG. 24. This flow chart corresponds to step m4 in the flowchart shown in FIG. 22. At step p1, the runaway detecting means which has detected the runaway requests an interruption to the CPU 82, and the CPU 82 carries out the interruption processing.

At step p2, the total number of copies made by the copying machine at the time of the detection of the runaway is counted, and the number of times the runaway has been detected is further counted as described in conjunction with the second embodiment. Based on the total number of copies and the number of times the runaway was detected, the probability of the generation of the runaway detected this time is calculated. The generation probability is calculated by dividing the number of times the runaway was detected by the total number of copies.

At step p3, the probability W of the next runaway generation is calculated from the probability of the generation of the runaway detected this time and the probability of the past runaway generation stored in the first memory. The probability W of the next runaway generation is calculated by determining a increase rate of the probabilities of the runaway generation from the past up to the present time.

At step p4, it is judged whether or not the calculated probability W of the next runaway generation is equal to or greater than predetermined probability X. When the probability W is equal to or greater than predetermined probability X, the process proceeds to step p5. When the probability W is less than probability X, the process proceeds to step p6 (m6). At step p5, either the operation of the copying machine described previously is suspended without allowing the copying machine to restore automatically or the LCD display displays a warning to allow the copying machine to restore automatically. At step p6, the copying machine provided with the runaway detection and restoration device is automatically restored. Incidentally along with the processing operation shown in the aforementioned flowchart, the interruption processing in the first embodiment may also be carried out at the same time. When the evaluation value H calculated in the first embodiment is equal to or greater than the constant J, it may be determined whether or not the automatic restoration may be carried out from the probability W of the next runaway generation calculated in the third embodiment.

As described above, a simple repetition of the detection of the runaway and the automatic restoration will result in a higher possibility that the runway will not be detected at all which posed a great danger to the apparatus. That is, when the probability is high that the runaway is generated next time and it is also predicted that, for example, the paper is being fed and the heating device such as the heater or the like is being controlled for fixing the paper in the fixing section just at the same time when the runaway is generated so that a danger of fire is posed to the apparatus or to the user, an inadvertent reset of the apparatus can be prevented by predicting the probability that the runaway is generated next time as described above. In this manner, since more accurate information can be obtained with respect to the automatic restoration as described above, a reliability of the judgment will be higher thereby heightening the safety of the apparatus. In particular, when the CPU is provided with a plurality of runaway detecting means, the probability of the runaway generation can be predicted with respect to the apparatus for each type of runaway from information obtained from each of the plurality of means thereby making it possible to protect the apparatus from the danger of the runaway.

By the way, the runaway of the CPU can be excited by many causes, and is often generated by the complication of a sporadic runaway and the runaway of a high generation probability with respect to the apparatus (one runaway is generated after another). Thus the cause of the runaway is complicated in many cases. Consequently, the apparatus cannot be controlled in some cases just by judging that the control has attained a certain level.

Therefore, the runaway can be ranked at the following three levels from the history of the past generation of the runaway in terms of the generation probability thereof: (1) the runaway is sporadic (accidental) and is expected to be generated again at a low probability after the automatic restoration, (2) the runaway is sporadic (accidental) and is generated regardless of the runaway-related information to each other but is generated again at a frequency beyond a certain level, and (3) the runaway is extremely dangerous and regardless of the generation frequency and it is judged that the automatic restoration is required to be needed. Thus such a configuration may be employed as re-initialization setting operation control is carried out when the generation probability is on the first specified level or less. An error display is given when the generation probability is within a range from the first to the second specified levels, and the operation control of the copying machine is stopped when the generation probability is above the second specified level.

Now the processing operation of the runaway detection/restoration device will be described with reference to the flowchart shown in FIG. 25. This flow chart is the flowchart shown in FIG. 24 wherein step Q is substituted. The substituted step Q will be described, and description of other steps is omitted. At step q1, it is judged whether or not the generation probability W of the next runaway calculated at step p3 in the flowchart of FIG. 24 is equal to or greater than the first probability X1 and the second probability X2. The process proceeds to step q2 when the generation probability is equal to or greater than the first probability X1 and the second probability X2, and proceeds to step q3 when the generation probability is below the second probability X2. At step 2, the operation of the copying machine is suspended without allowing the copying machine to be automatically restored.

In step q3, it is judged whether the generation probability W of the next runaway is equal to or greater than the first probability X1. The procedure proceeds to step q4 when the generation probability is equal to or greater than the first probability X1, and proceeds to step q5 when the generation probability is below the first probability X1. In step q4, error is displayed on the LCD display of the copying machine. In step q5, the copying machine is automatically restored by the re-initialization setting operation control circuit described previously. Therefore, appropriate control can be done according to the level of generation probability, making it possible to improve the apparatus safety.

This feature will be described below with reference to a Mean Copies Between Failure (MCBF) shown in FIG. 26. The MCBF represents the rate of error generation with respect to the total number of copies in terms of the number of copies. It is possible to say that a greater number of copies would lead to a lower probability of error generation. Then the MCBF is usually determined by predicting from the life of the copying machine. Therefore, it becomes possible to estimate the degree of danger at the time of the error generation in the copying machine. On the basis of the concept of the MCBF, when the generation probability exceeds the level determined by the MCBF, the automatic restoration is restored. When the generation probability is equal to a level determined by the MCBF, a warning display is provided. When the generation probability is less than the level determined by the MCBF, the automatic restoration is carried out.

Figure 26:
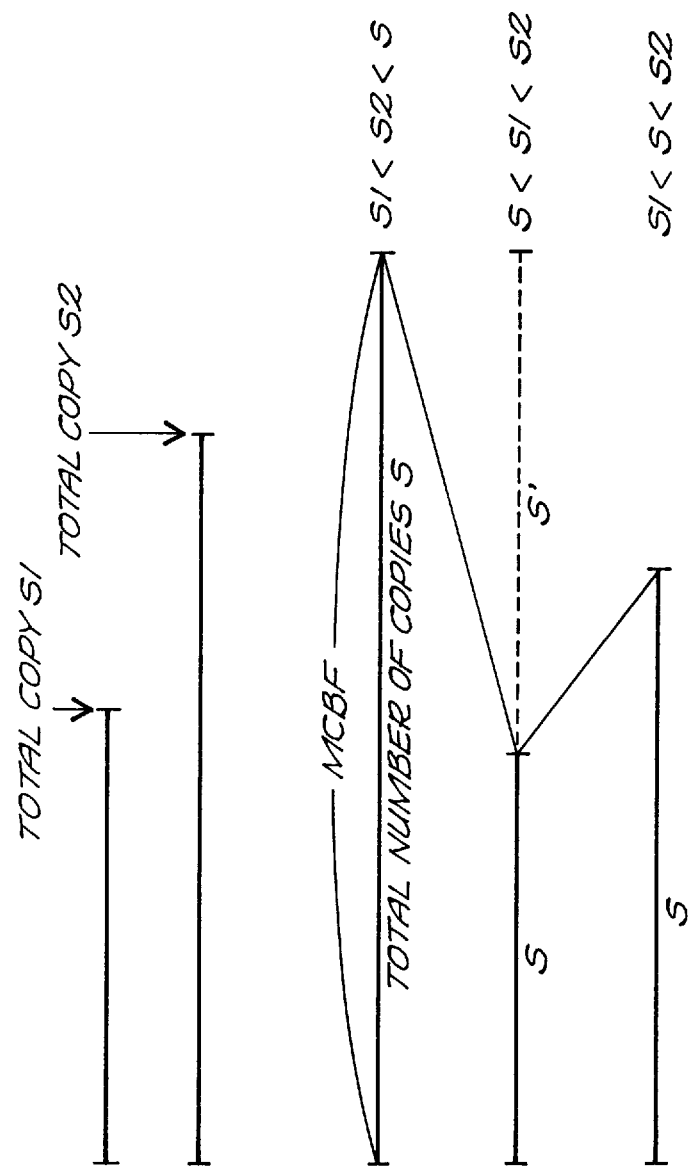
FIG. 26 is a view showing a relationship between the Means Copies Between Failure (MCBF) and the timing of runaway detection.

When the MCBF is set to S as shown in FIG. 26, cases (1) through (3) can be conceived from the timing of the runaway detection. It is assumed here that the frequency of error generation is set to 1 and the probability of the error generation to be evaluated is set to 1/S.

(1) In the case of S1<S2<S

This is a case in which the runaway is detected at timing of S1 and S2 with respect to the MCBF, which can be regarded as a trouble of the copying machine. In this case, probability of runaway detection (generation probability of runaway in the CPU) is considered to be 2/S2 which satisfies the inequality of 2/S2>1/S.

This probability is higher than the generation probability determined by the MCBF. Therefore, the copying machine restricts the automatic restoration.

(2) In the case of S<S1<S2

This is a case in which no runaway detection is carried out with respect to the MCBF. In this case, although there is no problem in the first period (period S in FIG. 26), the CPU generated the runaway twice in the next period (period S' in FIG. 26). The generation probability in this case is 2/2S like the case (1), while the probability is calculated from MCBF as shown in the following equation;

$$2/\{2\cdot(S+S')\}=2/2\cdot S=1/S$$

Although the inequalities of $2/S2>1/S$ and $S<S1<S2<2 \cdot S$ holds and therefore the number of incidences is the number determined from MCBF, thus the copying machine provides a warning display and an automatic restoration is carried out.

(3) In the case of $S1<S<S2$

The generation probability in the runaway detection (1) is $1/S1$ which is greater than the generation probability determined from MCBF, namely $1/S1>1/S$, thus the copying machine provides a warning display and an automatic restoration is carried out. In the next runaway detection (2), the generation probability is $2/2S$, while $2/S2>1/S$ holds true like the case (2). However, the inequality of $S<S1<S2<2 \cdot S$ holds and therefore the copying machine provides a warning and the automatic restoration is carried out.

The runaway detection/restoration device according to a fourth embodiment of the invention will now be described. The runaway detection/restoration device according to the fourth embodiment has the same configuration as the runaway detection/restoration device according to the first embodiment and therefore description thereof will be omitted. The runaway detection/restoration device according to the fourth embodiment restricts the automatic restoration when the generation frequency which represents an increase in the probability of the runaway over the previous incidence is not lower than a predetermined value in the interruption processing of the CPU 83, namely at step m4 in the flowchart shown in FIG. 22.

It is very likely that the runaway of the CPU may not only cause a fatal damage to an apparatus but also injure the user, and therefore the apparatus is designed so as not to generate the runaway. Consequently, most of the runaway incidences of CPUs in an apparatus are sporadic, and many of the runaways are caused by external factors, particularly noises. There are cases in which noises (internally generated noises) may be generated as a result of secular changes depending on the operation conditions (years of service) with the apparatus having a driving part. In particular, the noise is conspicuous in moving parts and sliding parts having such members as a motor shaft and a shielding earth plate or the like. It is difficult to identify the cause which generates such runaway of the CPU. Besides, the runaway will be generated very frequently after a certain point of time so that the apparatus will be endangered. To assess such a situation, the generation frequency is used.

Figure 24:
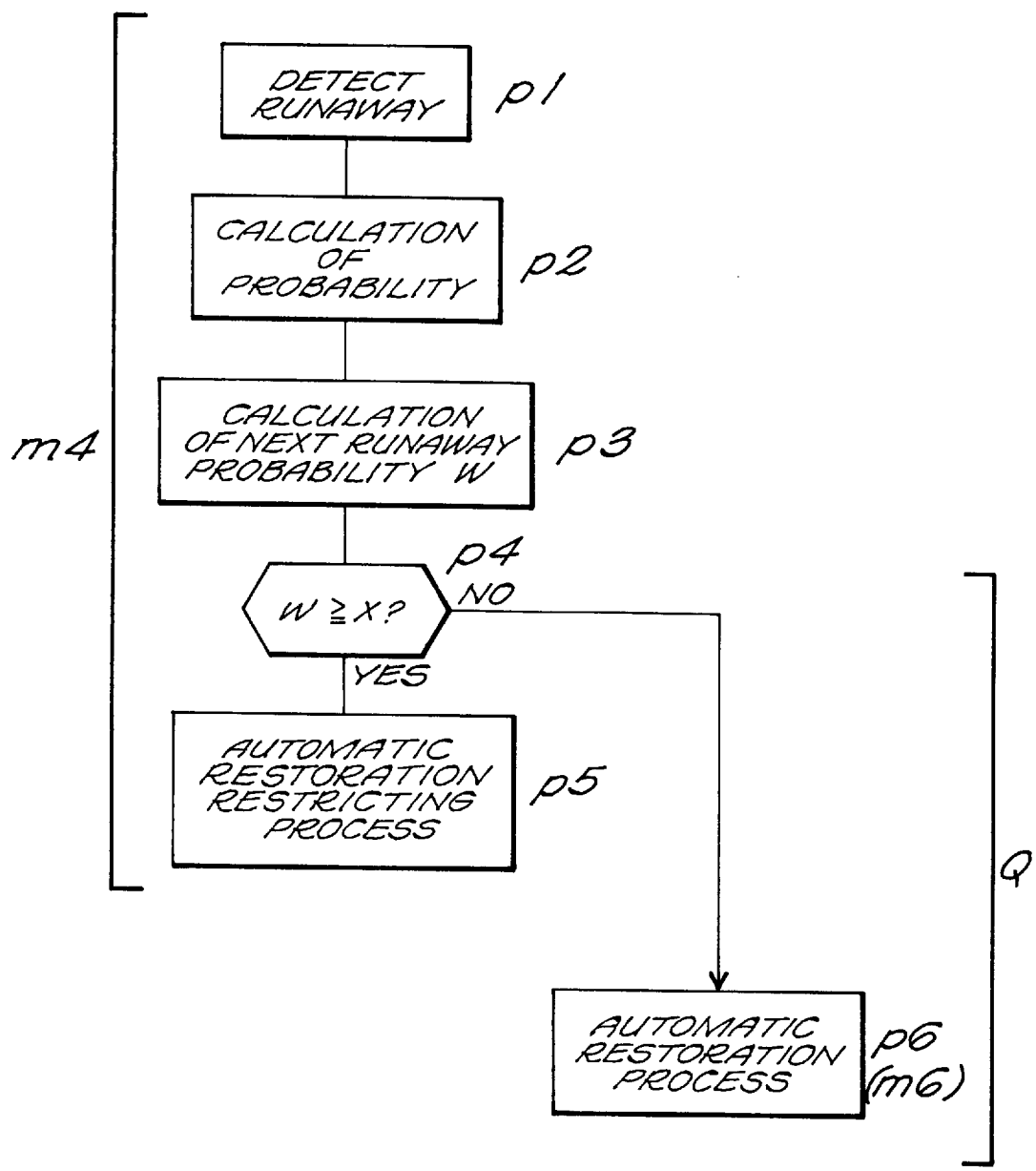
FIG. 24 is a flowchart explaining the processing operation of the runaway detection/restoration device according a third embodiment of the invention.
Figure 25:
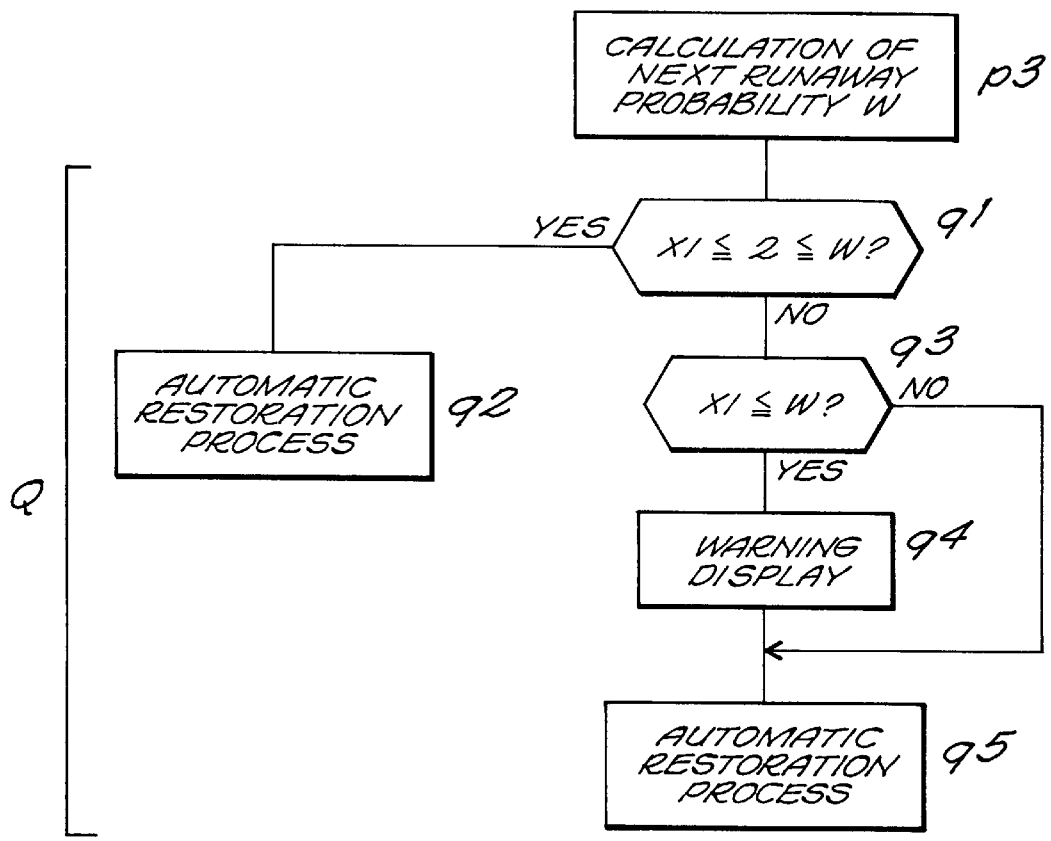
FIG. 25 is a flowchart explaining the other judging operation in the flow chart of FIG. 24.

Since other steps of the runaway detection and the interruption processing operations in the runaway detection and restoration device according to the fourth embodiment is the same as the counterparts in the third embodiment except that the generation frequency is changed in place of the probability W of the next runaway generation at step p3 and step p4 of the flowchart shown in FIG. 24, an explanation thereof will be omitted. At step p3, the probability of the past runaway generation memorized in the first memory 87a is compared with the probability of the current runaway generation so the generation frequency which is an increase in the generation probability will be calculated. At step p4, it is judged whether the calculated generation frequency is equal to or greater than a specified level. The process proceeds to step p5 when it is equal to or greater than the specified level and automatic restoration restriction process of the copying machine is carried out. When it is below the specified value, the process proceeds to step p5 where the automatic restoration process of the copying machine is carried out. Alternatively, the processing operation may be carried out by changing the generation frequency instead of the generation probability W of the next runaway at steps q1 and q3 of the flowchart shown in FIG. 25.

Specifically, the generation probability determined at the time of the previous runaway detection is stored in a storage area (M1) which is different from the storage area (M) for the evaluation value of the first memory 87a, and the total number of copies of the copying machine at the time of the runaway detection is also stored in the storage area (M2). A difference between the total number of copies at the time of previous generation of the runaway and the total number of copies at the time of the detection of the current runaway is determined from the total number of copies stored in the storage area (M2), thereby determining the generation probability from the previous generation by means of this difference. Thus it becomes possible to evaluate the increase in the generation probability thereby predicting an increase in the frequency of the generation probability over the previous generation probability.

This will be described with reference to FIG. 23. In the judgment based on the generation probability, the result was the same both in the cases (2) $S<S1<S2$ and (3) $S1<S<S2$. However, in the judgment based on the generation frequency, the runaway is generated at a probability of $2/(S2-S)$ in the period S' in the case of (2) when viewed in the next MCBF cycle. Thus, when the same judgment is passed, the automatic restoration is restricted.

According to this embodiment described above, since the operation is controlled in accordance with a degree of increase in the generation probability unlike the case of the operation control in accordance with the increase in the generation probability which is simply determined, it is possible to judge whether the generation probability rapidly increased or not (whether the generation frequency has increased rapidly or not) thereby making it possible to judge the degree of danger immediately so that a safer automatic restoration can be achieved.

The runaway detection/restoration device according to a fifth embodiment of the invention will now be described. The runaway detection/restoration device according to a sixth embodiment has the same configuration as the runaway detection/restoration device according to the first embodiment so that a description thereof will be omitted. The runaway detection/restoration device according to the fifth embodiment restricts the automatic restoration, as the number of times the runaway is detected is counted for each of a plurality of image forming modes provided in the copying machine which is provided with this runaway detection and restoration device and the number of times the runaway is detected reaches a predetermined value when the image forming mode is selected, in the interruption processing of the CPU 83, namely at step m4 in the flowchart shown in FIG. 22.

The copying machine is provided with a plurality of image forming modes. For example, a warm-up mode before the copying machine becomes ready to copy a document after the power is turned on, a copy mode for copying the document, an option mode for rearranging the copy sheets by means of a sorter or the like are provided as image forming modes. The copy mode further includes a plurality of image forming modes depending on the method of copying the document.

Furthermore, the operation control of each device in the copying machine differs depending on the image forming mode. In the warm-up mode, for example, the operation control such as the control of the fixing heater and the control of a high-voltage charger to prepare for image forming are carried out. In the copy mode, the operation control such as the control of the document image scanning, a paper feed/transportation control and image forming control (a process control, a high-voltage charger control) are carried out. In the option mode, an operation control such as RADF control, a sorter control and an auditor control are carried out.

Objects to be controlled varies depending on the image forming mode and the degree of danger in the case of the CPU runaway greatly varies depending on the object to be controlled. For example, the runaway during the movement of the mirror base in the copy mode involves a danger of generating the breakage of the mirror base. In the case of warm-up mode, on the other hand, the apparatus is placed in a ready wait status to wait for copying the document after the warm-up mode is ended. Since there is almost no objects to be controlled at this time, many of the runaway incidences are regarded as sporadic in the case of the runaway in the read-wait status. It is possible to predict that the danger is relatively small at the time of the reset restoration. At this time, the apparatus is at a standstill in most cases, and it is often presumed that the CPU runaway is generated by an external noise.

Therefore, in some cases it is more rational to judge the automatic restoration in the image forming mode when runaway is detected. Besides, in the case of a copying machine, devices and circuits to be used and controlled differ depending on the way of copying documents, and the runaway of CPU is generated when using particular devices in some cases. Thus it may be more rational to judge the automatic restoration by the way of copying documents (image forming mode).

The processing operations of the runaway detection and restoration device according to the fifth embodiment will be described below with reference to the flowchart shown in FIG. 27, in the case of four image forming modes; (1) S→S (single→sided document to single sided copy), (2) S→D (single→sided document to double sided copy), (3) D→S (double→sided document to single sided copy) and (4) D→D (double→sided document to double sided copy). This flowchart corresponds to step m4 in the flowchart of FIG. 22. At step r1, the runaway detecting means which detects the runaway makes an interruption request to the CPU 82, and the interruption processing is carried out in the CPU 82.

At step r2, it is determined which image forming mode was used at the time of the detection of the runaway. As described above, it is determined in which of the image forming modes (1) S→S, (2) S→D, (3) D→S and (4) D→D the runaway was detected. At step r3, the content of the CPU processing provided for each mode is selected. For the image forming mode determined at step r2, in the case of (1) for example, content of processing No. 1 in Table 6 is selected and, for the cases (2) and (3), No. 2 through No. 4 in Table 6 are selected similarly. Besides, one of the evaluation values A through D shown in Table 6 which are selected according to the image forming modes (1) through (4) is selected for the image forming mode determined at step r2, and is stored in the accumulator acc.a of the CPU 82 shown in FIG. 19. When the image forming mode is determined to be (1), for example, the evaluation value A (=+1) is stored in the accumulator acc.a.

At step r4, the processing is carried out according to the content of processing of the selected number. Evaluation value (denoted as (M) in Table 5) until the current detection of the runaway stored in the first memory 87a is stored in the accumulator acc.b of the CPU 82 for each selected number, and is added with the value of the accumulator acc.a. The calculated evaluation value of the accumulator acc.b is allowed to correspond to the selected number, and is stored in the first memory 87a.

At step r5, it is judged whether the evaluation values calculated for the selected numbers are equal to or greater than a preset constant R. The procedure proceeds to step r6 when the evaluation value is equal to or greater than the constant R, and proceeds to step r7 when it is below the constant R. At step r6, the copying machine described previously is placed in a status of operation stop without being automatically restored, or a warning is displayed on the LCD display 25 and the copying machine is automatically restored. At step r7 (m6), the copying machine provided with the runaway detection/restoration device is automatically restored.

TABLE 5

| No. | Content of processing |
|---|---|
| 1 | acc.b←(M) + acc.a |
|   | (M)←acc.b |
| 2 | acc.b←(M) + acc.a |
|   | (M)←acc.b |
| 3 | acc.b←(M) + acc.a |
|   | (M)←acc.b |
| 4 | acc.b←(M) + acc.a |
|   | (M)←acc.b |

TABLE 6

| A | B | C | D |
|---|---|---|---|
| +1 | +1 | +1 | +1 |

At this time, assuming that the evaluation values A through D in Table 6 are all set to "1", it is obvious that it indicates the number of times runaway as detected in each copy mode, and weighing may also be given to the evaluation point for other mode. For the constant R, it is also obvious that the setting of R=2 causes an error processing to be carried out when the runaway is detected in the same copy mode as the second copy mode, and that the setting of R=3 leads to third copy mode.

As shown in the fifth embodiment described above, when the runaway is detected in each image forming mode and the automatic restoration is restricted, it is relatively easy to identify the cause of the runaway from a load driven or the behavior of the controlled object such as a sensor in the image forming mode. And in the case of the runaway unrelated to the controlled object in the image forming mode, it can be presumed that the cause is an external factor of sporadic (accidental) nature which is important information for the restoration of the copying machine.

Here, when the runaway is detected in a specific image forming mode and the number of times the runaway is detected exceeds the specified time so that the operation control of the copying machine is stopped, the down time of the copying machine increases and the operation rate decreases. Therefore, when the runaway is detected in a particular image forming mode and the number of times the runaway is equal to or greater than the specified value, the re-initialization setting operation control is carried out, and the image forming mode is memorized as the failure mode. Then a warning is issued and the image forming operation is prohibited only when the image forming mode is selected.

At step r6 of the flowchart shown in FIG. 27, for example, the automatic restoration process is carried out after storing the error information such as evaluation value in each image forming mode in the first memory 87a. Thereafter, when the image forming mode corresponding to the error information is selected, the operation is prohibited and a warning is displayed. The warning may be given either in the form of message displayed on the operation panel or in the form of sound such as a buzzer or the like. At step r6, such a procedure may also be employed as the basis for the image forming mode in the case of (1) S—S as the automatic restoration is restricted only in this case and the automatic restoration is carried out in other image forming modes.

Since this configuration does not allow carrying out a specific image forming mode, but the configuration allows carrying out other image forming mode, the down time of the copying machine can be minimized and the operation rate can be improved.

The runaway detection/restoration device according to a sixth embodiment of the invention will now be described. The runaway detection/restoration device according to the sixth embodiment has the same configuration as the runaway detection/restoration device according to the first embodiment. Thus the description thereof will be omitted. The runaway detection/restoration device according to the sixth embodiment restricts the automatic restoration, as the number of times the runaway is detected is counted for each of a plurality of the runaway detecting means provided in a copying machine which is provided with this runaway detection/restoration device and when the number of times the runaway detected reaches a specified number of times, in the interruption processing of the CPU 83, namely at step m4 in the flowchart shown in FIG. 22.

There are various types of detecting means each of which has its merits and demerits and a degree of danger involved therein is different from one another. A watchdog timer, for example, takes a certain period of time and, in most cases, is forestalled by other runaway detecting means. That is, the runaway detecting means based on the detection of the execution of the undefined instruction, the privilege violation, the illegal memory access across boundary or the like detects the runaway earlier. When the runaway is detected by the detecting means based on the illegal memory access across boundary, an unrestorable damage may be caused in the copying machine depending on the situation. While a memory area where various data are stored is usually set to a mode which allows only reading data. However, when the runaway is generated, an attempt may be made to write data in this memory area by ignoring the setting of the memory area, which causes a danger for the copying machine. At this time, it is fatal to carry out the automatic restoration and it may become difficult to identify the cause of the destruction of data. Thus a safe automatic restoration can be achieved by judging the situation depending on the degree of danger estimated from the type of runaway detecting means.

Specifically, a storage area is secured in the first memory 87a for storing the evaluation points for each content of the runaway detection at step n2 of the flowchart shown in FIG. 23, thereby evaluating and judging each of the content of the runaway detection at step n6. That is, the number of times the runaway was detected by the runaway detecting means of the same type are counted, and a trouble is displayed or the operation control is stopped when the count reaches a specified number of times.

Although the processing after detecting the runaway of the CPU 82 in the first through the sixth embodiments described above is carried out after detection by the runaway detecting means after the power is turned on, the automatic restoration (resetting process) by the copying machine itself and the resetting process by the user when turning on the power are almost identical. Consequently, after detecting the runaway and processing the trouble, there is a possibility that the information related to the runaway is lost because of resetting of the power leading to the runaway of the CPU again. For this reason, in order to prevent the recurrent runaway of the CPU 82 due to resetting of the power, the runaway detection control may also be carried out at least at the time of turning on the power to the copying machine or during re-initialization setting operation control, provided that the history of past runaway is stored. That is, a judgment operation may be carried out after the automatic restoration or turning on the power, in addition to the judgment of the history of the past runaway of the CPU 82 may be carried before the automatic restoration.

For this purpose, such a configuration may also be employed that the history of the past runaway of the CPU is stored in the first memory 87a which is a non-volatile memory such as a rewritable flash memory and can hold the stored information when the power is turned off, while the same resetting process as the resetting process of the CPU 82 at the time of turning on the power is carried out when the runaway is detected and it is decided whether or not the operation control is determined according to the information related to the runaway during the resetting process, thereby to store the circumstances of the runaway in the first memory 87a when detecting the runaway of the CPU 82.

Specifically, in the flowchart shown in FIG. 23, evaluation and judgment at step n6 are not carried out after executing step n5 to carry out automatic restoration unconditionally, and the operations following step n6 are carried out during the automatic restoration. That is, the operation of the automatic restoration is made equivalent to the process during the turning on of the power (a shared use of the routine), evaluation and judgment operations following step n6 are carried out whenever the power is turned on.

With the configuration described above, the recurrent runaway of the CPU 82 can be prevented at the time of turning on the power again when the automatic restoration is restricted by the judgment after detecting the runaway. Besides, it is made possible to evaluate and judge the result of the previous runaway detection every time the power is turned on while processing by the runaway detecting means at the time of the runaway detection will result in driving the automatic restoration means once, thereby making it possible to unify the processing. Besides this enables eliminating the need of allowing the recurrence of the same processing at the time of turning on the power and at the time of detecting the runaway, thereby achieving the simplification of the processing.

Meanwhile the information related to image forming is stored and held as data in the first memory 87a which is a non-volatile memory such as a rewritable flash memory in the first through sixth embodiments. The data content may be adjustment data directly related to image forming or count value for monitoring the service life of a device, etc. In any case, inadvertent loss of data is a fatal damage to the copying machine, and data must be held very carefully. In reality, however, data there occurs a case when data is lost due to runaway of the CPU. Therefore, preparation is taken against the loss of data by providing a backup system such as holding duplicate data. Even with such a system, current data such as count value cannot be prevented from being lost. Many of the causes of inadvertent data loss are runaway of the CPU, and unconditional execution of automatic restoration after destruction of data due to runaway leads to serious danger. Besides the runaway of the CPU, data may be lost due to a faulty memory or external causes, which can be regarded as sporadic accidents. When viewed from the viewpoint of memory protection against the runaway of the CPU, there are sporadic causes and causes which will lead to the recurrent runaway thereof. However, the cause of the data loss cannot be identified and the automatic restoration is carried out in many cases, resulting in the difficulty of giving a sufficient assurance to the data to be protected.

For this reason, in order to protect data, a second memory 87b for storing information related to the image forming is provided as shown in FIG. 1 in addition to the first memory 87a for storing information related to the runaway detected by the runaway detecting means, an data stored in the second memory 87b is checked and, when an error in data stored in the second memory 87b is detected, it is judged whether the data was inadvertently written over according to the information related to the runaway stored in the first memory 87a, while it is further decided whether to carry out the automatic restoration after repairing the data of the second memory 87b or to restrict the automatic restoration according to the result of judgment.

When it is decided in this procedure that there is an error in the data stored in the memory, it is judged from the total number of copies whether or not the runaway of the CPU is generated. Thereafter, when it is judged that the runaway of the CPU is generated, it is judged whether or not the runaway of the CPU has been detected by an abnormal access to the memory. When it is judged that the runaway has been detected from the abnormal access to the memory, it is judged that it is highly probable that the data trouble in the memory has been caused by the runaway. It can be expected that there is a high possibility of the recurrence of the CPU runaway due to the memory trouble, after the automatic restoration of the devices. Thus it can be judged whether the data trouble was caused by the runaway of the CPU or by other sporadic cause, thereby making it possible to identify the cause of the data loss and carry out the automatic restoration of the copying machine safely while protecting the data.

Incidentally, the invention is not limited to the embodiments described above. The invention can be applied, for example, to apparatuses where CPUs are used in addition to copying machines.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A runaway detection and restoration device comprising:
   a processor for controlling an apparatus,
   runaway detecting means for monitoring an abnormal state of a sequential control program of an operation of the apparatus to detect a runaway of the processor;
   memory means for storing an operation mode of the apparatus when the runaway is detected by the runaway detecting means; and
   restoration control means for regulating an operation in the operation mode when, by referring to the memory means at the time of the detection of the runaway, it is judged that the number of times the runaway is detected by the detecting means in the same operation mode exceeds a predetermined value.

2. The runaway detection and restoration device of claim 1, wherein when the number of times the runaway is detected in the same operation mode is equal to or smaller than a predetermined number of times, the restoration control means carries out the automatic restoration.

3. The runaway detection and restoration device of claim 1, the device further comprising a display means for displaying an abnormal state,
   wherein when the number of times the runaway is detected in the same operation mode is smaller than a specified number, the restoration control means carries out the automatic restoration, and when the number of times the runaway is detected is equal to or larger than the specified number, an error indication is given with the display means and the automatic restoration is carried out, or the operation control of the apparatus is stopped.

4. The runaway detection and restoration device of claim 1,
   wherein when the number of times the runaway is detected in the same operation mode is equal to or larger than a specified number of times, the restoration control means carries out the automatic restoration to store the operation mode and the operation of the apparatus is inhibited when the operation mode is selected.

5. A runaway detection and restoration device comprising:
   a processor for controlling an apparatus;
   runaway detecting means for monitoring an abnormal state of a sequential control program of an operation of the apparatus to detect the runaway of the processor;
   runaway generation frequency calculating means for calculating a runaway generation frequency on the basis of the use time from the detection of the previous runaway to the detection of the current runaway, in response to an output of the runaway detecting means;
   memory means for storing the runaway generation frequency in response to an output from the runaway generation frequency calculating means; and
   restoration control means for judging whether or not the processor is to be automatically restored, depending on the runaway generation frequency in the memory means when the runaway is detected.

6. The runaway detection and restoration device of claim 5, the device further comprising a display means for displaying an abnormal state in response to an output from the restoration control means,
   wherein, when the runaway frequency is smaller than a predetermined first frequency, the restoration control means allows the processing device to be automatically restored, when the runaway frequency is included within a range of the first frequency to a predetermined second frequency, the restoration control means allows the processing device to be automatically restored by providing an alarm display, and when the runaway frequency is larger than the second frequency, the restoration control means allows the control of the apparatus to be suspended.

7. A runaway detection and restoration device comprising:
   a processor for controlling an apparatus,
   runaway detecting means for monitoring an abnormal state of a sequential control program of an operation of the apparatus, the runaway detecting means comprising a plurally of detecting sections which detect the runaway of the processor, and for each of which a predetermined runaway evaluation value is predetermined;
   memory means for storing a runaway evaluation value determined for each detecting section, the value being given from the detecting section of the runaway detecting means which has detected the runaway; and restoration control means for allowing the processor to be automatically restored when the runaway evaluation value of the memory means is smaller than a predetermined value and for suspending the control of the apparatus when the evaluation value is larger than the predetermined value at the time of the detection of the runaway.

8. A runaway detection and restoration device comprising:

a processor for controlling an apparatus, runaway detecting means for monitoring an abnormal state of a sequential control program of an operation of the apparatus to detect a runaway of the processor;

first memory means for storing information related to the runaway detected by the runaway detecting means;

second memory means for storing information related to an operation of the apparatus when the runaway is detected by the runaway detecting means;

verifying means for confirming the information stored in the second memory means; and restoration control means for judging whether or not the processor is to be automatically restored depending on the content of the information related to the runaway stored in the first memory when the information stored in the second memory means is abnormal.

* * * * *